US009642175B2

(12) United States Patent
Guo et al.

(10) Patent No.: US 9,642,175 B2
(45) Date of Patent: May 2, 2017

(54) METHOD, DEVICE, AND SYSTEM FOR MULTIPLE USERS COOPERATIVE COMMUNICATION

(71) Applicant: Huawei Technologies Co., Ltd., Shenzhen, Guangdong (CN)

(72) Inventors: Xiaolong Guo, Beijing (CN); Lixue Zhang, Beijing (CN); Yue Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 50 days.

(21) Appl. No.: 14/673,323

(22) Filed: Mar. 30, 2015

(65) Prior Publication Data
US 2015/0208456 A1 Jul. 23, 2015

Related U.S. Application Data

(63) Continuation of application No. PCT/CN2012/082502, filed on Sep. 29, 2012.

(51) Int. Cl.
*H04W 4/00* (2009.01)
*H04W 76/02* (2009.01)
(Continued)

(52) U.S. Cl.
CPC ..... *H04W 76/023* (2013.01); *H04W 36/0033* (2013.01); *H04W 88/04* (2013.01); *H04W 88/10* (2013.01)

(58) Field of Classification Search
CPC ..... H04W 88/04; H04W 12/06; H04W 24/10; H04W 88/10; H04W 28/08
(Continued)

(56) References Cited

U.S. PATENT DOCUMENTS

2009/0005094 A1  1/2009  Lee et al.
2011/0082940 A1  4/2011  Montemurro et al.
(Continued)

FOREIGN PATENT DOCUMENTS

CN   101370301 A   2/2009
CN   101882979 A   11/2010
(Continued)

OTHER PUBLICATIONS

Complex Field Network Coding for Multiuser Cooperative Communications, Tairan Wang, Student Member, IEEE, and Georgios B. Giannakis, Fellow, IEEE, IEEE Journal on Selected Areas in Communications, vol. 26, No. 3, Apr. 2008.*
(Continued)

*Primary Examiner* — Joseph Arevalo

(57) ABSTRACT

Embodiments of the present invention disclose a method for multiple users cooperative communication. The method provided in the embodiments of the present invention includes: acquiring, by a core network node, information about MUCC capability identifiers of at least two UEs, where the MUCC capability identifiers are used to identify MUCC capabilities of the UEs; and sending, by the core network node, the information about the MUCC capability identifier of the at least two UEs to a radio access network node, to enable the radio access network node to select, according to the capability identifiers of the UEs, a UE having a supporting capability of the MUCC capability and a UE having a benefited capability of the MUCC capability, so that the UE having a supporting capability supports, in MUCC communication, a bearer of the UE having a benefited capability.

15 Claims, 8 Drawing Sheets

(51) Int. Cl.
*H04W 36/00* (2009.01)
*H04W 88/04* (2009.01)
*H04W 88/10* (2009.01)

(58) Field of Classification Search
USPC .................................. 455/41.2, 426.1, 552.1
See application file for complete search history.

(56) References Cited

U.S. PATENT DOCUMENTS

2011/0176477 A1* 7/2011 Lee .................... H04B 7/15592
370/315
2011/0228666 A1 9/2011 Barbieri et al.

FOREIGN PATENT DOCUMENTS

| | | | |
|---|---|---|---|
| CN | 102045688 A | | 5/2011 |
| WO | WO2011123809 | * | 6/2011 |
| WO | WO 2012/118311 A2 | | 9/2012 |

OTHER PUBLICATIONS

Cooperative Communications Protocol for Multiuser OFDM Networks, W. Pam Siriwongpairat, Member, IEEE, Ahmed K. Sadek, Member, IEEE, and K. J. Ray Liu, Fellow, IEEE, IEEE Transactions on Wireless Communications, vol. 7, No. 7, Jul. 2008.*
Multi-user Cooperative Communications with , Lei Caol Senior Member, IEEE, Jinyun Zhang2 Fellow, IEEE and Norio Kanno 3 Relay-Coding for uplink IMT-advanced 4G Systems, IEEE Communications Society subject matter experts for publication in the IEEE "Globecom" 2009 proceedings.*

* cited by examiner

101a: A core network node acquires information about MUCC capability identifiers of at least two user equipments, where the MUCC capability identifiers are used to identify MUCC capabilities of the user equipments, and the MUCC capability includes: a first benefited capability, a first supporting capability, first benefited and first supporting capabilities, a second benefited capability, or a second supporting capability 102a: The core network node sends the information about the MUCC capability identifiers of the at least two user equipments to a radio access network node, to enable the radio access network node to select, according to the capability identifiers of the user equipments, a user equipment having a supporting capability of the MUCC capability and a user equipment having a benefited capability of the MUCC capability, so that the user equipment having a supporting capability supports, in MUCC communication, a bearer of the user equipment having a benefited capability

FIG. 1a

101b: A radio access network node receives MUCC capability identifiers of at least two user equipments that are sent by a core network node, where the MUCC capability identifiers are used to identify MUCC capabilities of the user equipments, and the MUCC capability includes: a first benefited capability, a first supporting capability, first benefited and first supporting capabilities, a second benefited capability, or a second supporting capability 102b: The radio access network node selects, according to the capability identifiers of the user equipments, a user equipment having a supporting capability of the MUCC capability and a user equipment having a benefited capability of the MUCC capability, so that the user equipment having a supporting capability supports, in MUCC communication, a bearer of the user equipment having a benefited capability

FIG. 1b

101c: At least two user equipments send information about MUCC capability identifiers of the user equipments to a core network node, to enable the core network node to send the information about the MUCC capability identifiers of the at least two user equipments to a radio access network node, so as to enable the radio access network node to select, according to the capability identifiers of the user equipments, a user equipment having a supporting capability and a user equipment having a benefited capability of MUCC capability, so that the user equipment having a supporting capability supports, in MUCC communication, a bearer of the user equipment having a benefited capability, where the MUCC capability identifiers are used to identify the MUCC capabilities of the user equipments, and the MUCC capability includes: a first benefited capability, a first supporting capability, first benefited and first supporting capabilities, a second benefited capability, or a second supporting capability

FIG. 1c

201a: A radio access network node sends information about a MUCC capability identifier of the radio access network node to a core network node and a user equipment, so that the core network node and the user equipment initiate MUCC communication when the MUCC capability identifier of the radio access network node indicates that the radio access network node has a MUCC capability of supporting, where the MUCC capability identifier of the radio access network node is used to indicate that the radio access network node has a MUCC capability of supporting

FIG. 2a

201b: A first device receives information about a MUCC capability identifier of a radio access network node that is sent by the radio access network node, where the MUCC capability identifier of the radio access network node is used to indicate that the radio access network node has a MUCC capability of supporting 202b: If the MUCC capability identifier of the radio access network node indicates that the radio access network node has a MUCC capability of supporting, the first device initiates MUCC communication

FIG. 2b

301: A radio access network node receives information about a MUCC capability identifier of a core network node that is sent by the core network node, where the MUCC capability identifier of the core network node is used to indicate that the core network node has a MUCC capability of supporting 302: If the MUCC capability identifier of the core network node indicates that the core network node has a MUCC capability, the radio access network node initiates a MUCC operation on a user equipment that has registered with the core network node

FIG. 3

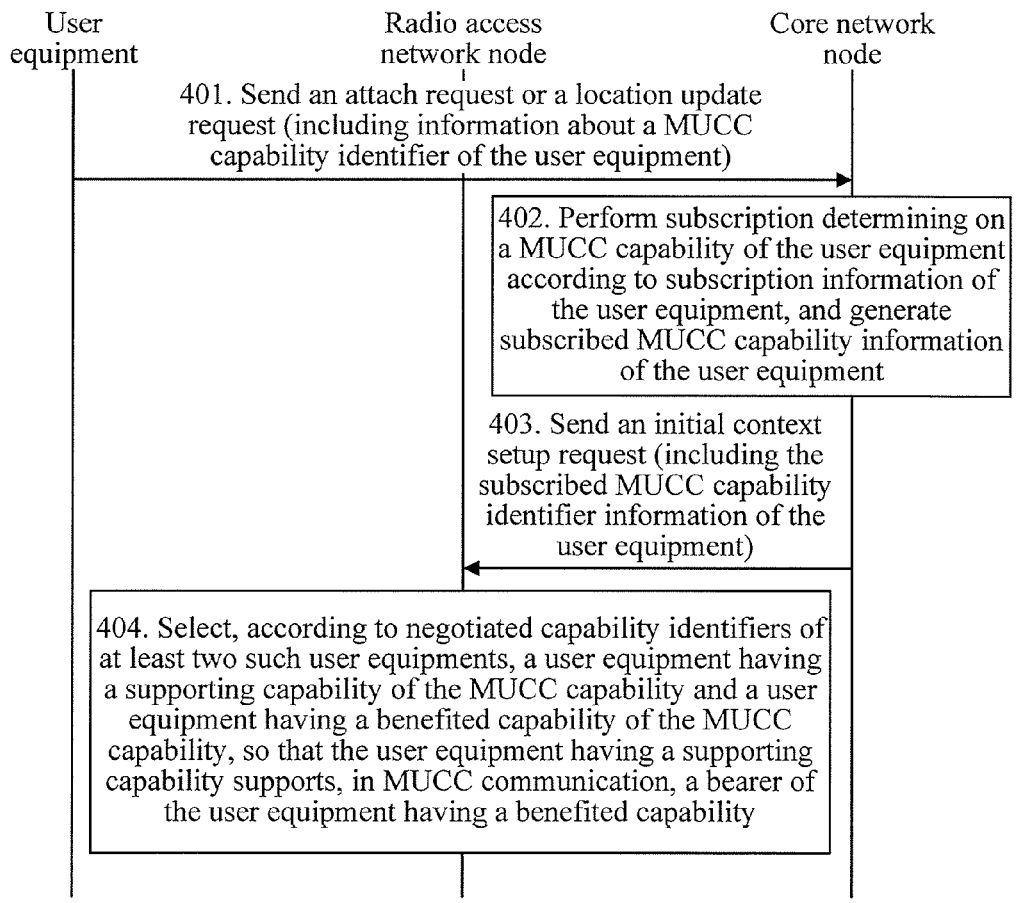

FIG. 4

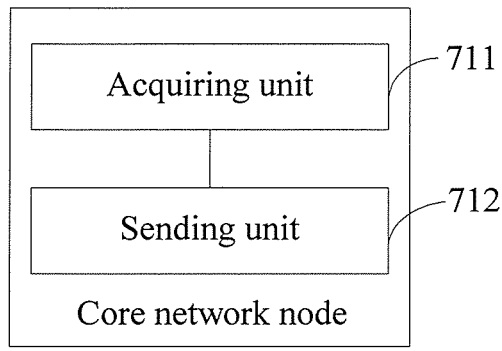
FIG. 7A1
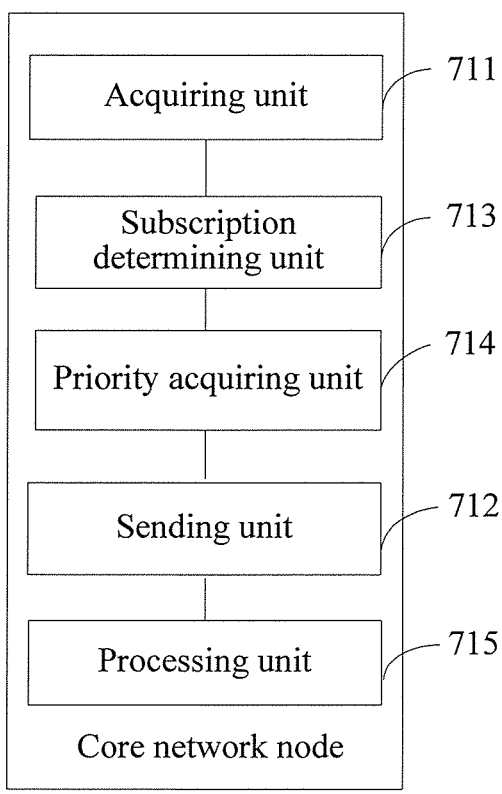
FIG. 7A2

METHOD, DEVICE, AND SYSTEM FOR MULTIPLE USERS COOPERATIVE COMMUNICATION

CROSS-REFERENCE TO RELATED APPLICATIONS

This application is a continuation of International Application No. PCT/CN2012/082502, filed on Sep. 29, 2012, which is hereby incorporated by reference in its entirety.

TECHNICAL FIELD

The present invention relates to the communications field, and in particular, to a method, device, and system for multiple users cooperative communication.

BACKGROUND

A smartphone basically can simultaneously support a short range communications technology, such as wireless fidelity (WiFi) or Bluetooth (Bluetooth), and a cellular communications technology, such as a Long Term Evolution (LTE) technology, a 3rd Generation Universal Mobile Telecommunications System (3G UMTS) or Wideband Code Division Multiple Access (WCDMA for short) technology, a 2nd Generation Global System for Mobile Communications (2G GSM) technology, or a Worldwide Interoperability for Microwave Access (WiMAX) technology.

Different user equipment's (UEs) may have different multiple users cooperative communication (MUCC) capabilities. For example, some UEs have a MUCC capability, while some. UEs do not; some UEs only intend to act as benefited UEs but do not intend to support other UEs, while some UEs intend to provide support but do not intend to receive benefit. Regarding how a network device acquires different MUCC capabilities of UEs, no solution is available in the prior art. Consequently, the network device is incapable of selecting, according to the different MUCC capabilities of the UEs, different UEs to perform proper multiple users cooperative communication.

SUMMARY

Embodiments of the present invention provide a method, device, and system for multiple users cooperative communication. MUCC capability identifiers of different UEs are acquired, and a UE having a supporting capability and a UE having a benefited capability are selected according to the capability identifiers of the UEs, so that the UE having a supporting capability supports, in MUCC communication, a bearer of the UE having a benefited capability, thereby improving reliability of multiple users cooperative communication.

To achieve the foregoing objective, technical solutions adopted in the embodiments of the present inventions are:

According to a first aspect, an embodiment of the present invention provides a method for multiple users cooperative communication, which includes:

acquiring, by a core network node, information about MUCC capability identifiers of at least two UEs, where the MUCC capability identifiers are used to identify MUCC capabilities of the UEs, and the MUCC capability includes: a first benefited capability, a first supporting capability, first benefited and first supporting capabilities, a second benefited capability, or a second supporting capability; and sending, by the core network node, the information about the MUCC capability identifiers of the at least two UEs to a radio access network node, to enable the radio access network node to select, according to the capability identifiers of the UEs, a UE having a supporting capability of the MUCC capability and a UE having a benefited capability of the MUCC capability, so that the UE having a supporting capability supports, in MUCC communication, a bearer of the UE having a benefited capability.

In a first possible implementation manner, according to the first aspect, the UE having a supporting capability of the MUCC capability refers to a UE having the first supporting capability, the first benefited and first supporting capabilities, or the second supporting capability; the UE having a benefited capability of the MUCC capability refers to a UE having the first benefited capability, the first benefited and first supporting capabilities, or the second benefited capability.

In a second possible implementation manner, according to the first aspect or the first possible implementation manner, specific implementation of the acquiring, by a core network node, information about MUCC capability identifiers of at least two UEs is:

receiving, by the core network node, attach requests or location update requests of the at least two UEs, where the attach requests or location update requests include the information about the MUCC capability identifiers of the UEs.

In a third possible implementation manner, according to the first aspect or the first possible implementation manner, specific implementation of the acquiring, by a core network node, information about MUCC capability identifiers of at least two UEs is:

receiving, by the core network node, capability information indications that are sent by the radio access network node and of the at least two UEs and saving the capability information indications, where the capability information indications of the UEs include the information about the MUCC capability identifiers of the UEs, and the capability information indications of the UEs are generated from capability information sent to the radio access network node by the UEs after the radio access network node sends capability query information to the UEs.

In a fourth possible implementation manner, according to the second possible implementation manner or the third possible implementation manner, specific implementation of the sending, by the core network node, the information about the MUCC capability identifiers of the at least two UEs to a radio access network node is:

sending, by the core network node, an initial context setup request or a handover request to the radio access network node, where the initial context setup request or handover request includes the information about the MUCC capability identifiers of the at least two UEs.

In a fifth possible implementation manner, according to the first aspect or any one of the foregoing possible implementation manners, the method further includes:

performing, by the core network node, subscription determining on the MUCC capabilities of the at least two UEs according to subscription information of the at least two UEs, and generating information about negotiated MUCC capability identifiers of the at least two UEs, where the negotiated MUCC capability identifiers are used to identify the MUCC capabilities of the UEs; and sending, by the core network node, the information about the negotiated MUCC capability identifiers of the at least two UEs to the radio access network node, to enable the radio access network node to select, according to the negotiated capability identifiers of the UEs, a UE having a supporting capability of the MUCC capability and a UE having a benefited capability of the MUCC capability, so that the UE having a supporting capability supports, in MUCC communication, a bearer of the UE having a benefited capability.

In a sixth possible implementation manner, according to the fifth possible implementation manner, the method further includes:

acquiring, by the core network node, updated information about the MUCC capability identifiers of the UEs, and sending, by the core network node, the updated information about the MUCC capability identifiers of the UEs to the radio access network node, to enable the radio access network node to delete, when an updated MUCC capability of a UE does not have a benefited capability and the UE is performing MUCC communication as a benefited UE, a supporting bearer of a supporting UE that supports the benefited UE; or to enable the radio access network node to delete, when an updated MUCC capability of a UE does not have a supporting capability and the UE is performing MUCC communication as a supporting UE, a supporting bearer of the supporting UE.

In a seventh possible implementation manner, according to the first aspect or any one of the foregoing possible implementation manners, the method further includes:

acquiring, by the core network node, MUCC priority capability information of the at least two UEs; and sending, by the core network node, the MUCC priority capability information of the at least two UEs to the radio access network node, to enable the radio access network node to select a UE having a low priority and a supporting capability and a UE having a high priority and a benefited capability, so that the UE having a low priority and a supporting capability supports, in MUCC communication, a bearer of the UE having a high priority and a benefited capability.

In an eighth possible implementation manner, according to the seventh possible implementation manner, specific implementation of the acquiring, by the core network node, MUCC priority capability information of the at least two UEs is:

setting, by the core network node, the MUCC priority capability information for the at least two UEs; or receiving, by the core network node, the MUCC priority capability information of the UEs that is sent by the at least two UEs.

In a ninth possible implementation manner, according to the first aspect, when the MUCC capability of the UE is the second supporting capability, the method further includes one or more of the following operations:

in a case in which no IP address is allocated to the UE, allowing, by the core network node, the UE to support a bearer of another UE;

in a case in which no PDN connection or bearer is set up for the UE, allowing, by the core network node, the UE to support a bearer of another UE; and in a case in which security authentication is not performed on the UE, allowing, by the core network node, the UE to support a bearer of another UE.

According to a second aspect, an embodiment of the present invention provides a method for multiple users cooperative communication, which includes:

receiving, by a radio access network node, MUCC capability identifiers of at least two UEs that are sent by a core network node, where the MUCC capability identifiers are used to identify MUCC capabilities of the UEs, and the MUCC capability includes: a first benefited capability, a first supporting capability, first benefited and first supporting capabilities, a second benefited capability, or a second supporting capability; and selecting, by the radio access network node according to the capability identifiers of the user equipments, a UE having a supporting capability of the MUCC capability and a UE having a benefited capability of the MUCC capability, so that the UE having a supporting capability supports, in MUCC communication, a bearer of the UE having a benefited capability.

In a first possible implementation manner, according to the second aspect, specific implementation of the receiving, by a radio access network node, information about MUCC capability identifiers of at least two UEs sent by a core network node is:

receiving, by the radio access network node, an initial context setup request or a handover request sent by the core network node, where the initial context setup request or handover request includes the information about the MUCC capability identifiers of the at least two UEs.

In a second possible implementation manner, according to the second aspect or the first possible implementation manner, the UE having a supporting capability of the MUCC capability refers to a UE having the first supporting capability, the first benefited and first supporting capabilities, or the second supporting capability; the UE having a benefited capability in the MUCC capabilities refers to a UE having the first benefited capability, the first benefited and first supporting capabilities, or the second benefited capability.

In a third possible implementation manner, according to the second aspect or the first possible implementation manner or the second possible implementation manner, the method further includes:

receiving, by the radio access network node, information about negotiated MUCC capability identifiers of the at least two UEs that is generated after the core network node performs, according to subscription information of the at least two UEs, subscription determining on the MUCC capabilities of the at least two UEs, where the negotiated MUCC capability identifiers are used to identify the MUCC capabilities of the UEs; and selecting, by the radio access network node according to the negotiated capability identifiers of the at least two UEs, a UE having a supporting capability of the MUCC capability and a UE having a benefited capability of the MUCC capability, so that the UE having a supporting capability supports, in MUCC communication, a bearer of the UE having a benefited capability.

In a fourth possible implementation manner, according to the third possible implementation manner, the method further includes: receiving, by the radio access network node, updated information about the MUCC capability identifiers of the UEs that is sent by the core network node; and if an updated MUCC capability of a UE does not have a benefited capability and the UE is performing MUCC communication as a benefited UE, deleting, by the radio access network node, a supporting bearer of a supporting UE that supports the benefited UE; or if an updated MUCC capability of a UE does not have a supporting capability and the UE is performing MUCC communication as a supporting UE, deleting, by the radio access network node, a supporting bearer of the supporting UE.

In a fifth possible implementation manner, according to the second aspect or any one of the foregoing possible implementation manners, the method further includes:

receiving, by the radio access network node, MUCC priority capability information of the at least two UEs that is sent by the core network node; and selecting, by the radio access network node, a UE having a low priority and a supporting capability and a UE having a high priority and a benefited capability, so that the UE having a low priority and a supporting capability supports, in MUCC communication, a bearer of the UE having a high priority and a benefited capability.

In a sixth possible implementation manner, according to the second aspect, when the MUCC capability of the UE is the second supporting capability, the method further includes:

keeping, by the radio access network node, the UE in an RRC connected state.

According to a third aspect, an embodiment of the present invention provides a method for multiple users cooperative communication, which includes:

sending, by at least two UEs, information about MUCC capability identifiers of the UEs to a core network node, to enable the core network node to send the information about the MUCC capability identifiers of the at least two UEs to a radio access network node, so as to enable the radio access network node to select, according to the capability identifiers of the UEs, a UE having a supporting capability and a UE having a benefited capability of the MUCC capability, so that the UE having a supporting capability supports, in MUCC communication, a bearer of the UE having a benefited capability, where the MUCC capability identifiers are used to identify the MUCC capabilities of the UEs, and the MUCC capability includes: a first benefited capability, a first supporting capability, first benefited and first supporting capabilities, a second benefited capability, or a second supporting capability.

In a first possible implementation manner, according to the third aspect, the UE having a supporting capability of MUCC capabilities refers to a UE having the first supporting capability, the first benefited and first supporting capabilities, or the second supporting capability; the UE having a benefited capability of the MUCC capability refers to a UE having the first benefited capability, the first benefited and first supporting capabilities, or the second benefited capability.

In a second possible implementation manner, according to the third aspect or the first possible implementation manner, specific implementation of the sending, by UE, the information about the MUCC capability identifier of the UEs to the core network node is:

sending, by the UE, an attach request or a location update request to the core network node, where the attach request or location update request includes the information about the MUCC capability identifier of the UE.

In a third possible implementation manner, according to the third aspect or any one of the foregoing possible implementation manners, the method further includes:

sending, by the UE, updated information about the MUCC capability identifiers of the UEs to the core network node, to enable the core network node to send the updated information about the MUCC capability identifiers of the UEs to the radio access network node, so as to enable the radio access network node to delete, when an updated MUCC capability of a UE does not have a benefited capability and the UE is performing MUCC communication as a benefited UE, a supporting bearer of a supporting UE that supports the benefited UE; or so as to enable the radio access network node to delete, when an updated MUCC capability of a UE does not have a supporting capability and the UE is performing MUCC communication as a supporting UE, a supporting bearer of the supporting UE.

In a fourth possible implementation manner, according to the third aspect or any one of the foregoing possible implementation manners, the method further includes:

sending, by the UEs, MUCC priority capability information of the UEs to the core network node, to enable the core network node to send the MUCC priority capability information of the UEs to the radio access network node, so as to enable the radio access network node to select a UE having a low priority and a supporting capability and a UE having a high priority and a benefited capability, so that the UE having a low priority and a supporting capability supports, in MUCC communication, a bearer of the UE having a high priority and a benefited capability.

According to a fourth aspect, an embodiment of the present invention provides a method for multiple users cooperative communication, which includes:

sending, by a radio access network node, information about a MUCC capability identifier of the radio access network node to a core network node and a UE, so that the core network node and the UE initiate MUCC communication when the MUCC capability identifier of the radio access network node indicates that the radio access network node has a MUCC capability, where the MUCC capability identifier of the radio access network node is used to indicate that the radio access network node has a MUCC capability.

In a first possible implementation manner, according to the fourth aspect, the MUCC capability identifier of the radio access network node further indicates that the radio access network node does not have a MUCC capability, so that the core network node and the UE skip initiating MUCC communication when the MUCC capability identifier of the radio access network node indicates that the radio access network node does not have a MUCC processing capability.

According to a fifth aspect, an embodiment of the present invention provides a method for multiple users cooperative communication, where the method includes:

receiving, by a first device, information about a MUCC capability identifier of radio access network node that is sent by the radio access network node, where the MUCC capability identifier of the radio access network node is used to indicate that the radio access network node has a MUCC capability of supporting; and initiating, by the first device, MUCC communication if the MUCC capability identifier of the radio access network node indicates that the radio access network node has a MUCC capability.

In a first possible implementation manner, according to the fifth aspect, the MUCC capability identifier of the radio access network node further indicates that the radio access network node does not have a MUCC capability, and the method further includes:

skipping initiating, by the first device, MUCC communication if the MUCC capability identifier of the radio access network node indicates that the radio access network node does not have a MUCC capability.

In a second possible implementation manner, according to the fifth aspect or the first possible implementation manner, the first device is a UE or a core network node.

According to a sixth aspect, an embodiment of the present invention provides a method for multiple users cooperative communication, which includes:

receiving, by a radio access network node, information about a MUCC capability identifier of a core network node that is sent by the core network node, where the MUCC capability identifier of the core network node is used to indicate that the core network node has a MUCC capability; and initiating, by the radio access network node, a MUCC operation on a UE that has registered with the core network node if the MUCC capability identifier of the core network node indicates that the core network node has a MUCC capability.

In a first possible implementation manner, according to the sixth aspect, the MUCC capability identifier of the core network node further indicates that the core network node does not have a MUCC capability, and the method further includes:

skipping initiating, by the radio access network node, a MUCC operation on a UE that has registered with the core network node if the MUCC capability identifier of the core network node indicates that the core network node does not have a MUCC capability.

In a second possible implementation manner, according to the sixth aspect or the first possible implementation manner, specific implementation of the receiving, by a radio access network node, information about a MUCC capability identifier of a core network node that is sent by the core network node is:

receiving, by the radio access network node, the information about the MUCC capability identifier of the core network node by using an S1 setup response message or a core network node configuration update message.

According to a seventh aspect, an embodiment of the present invention provides a core network node, which includes:

an acquiring unit, configured to acquire information about MUCC capability identifiers of at least two UEs, and transmit the information about the MUCC capability identifiers of the at least two UEs to a sending unit, where the MUCC capability identifiers are used to identify MUCC capabilities of the UEs, and the MUCC capability includes: a first benefited capability, a first supporting capability, first benefited and first supporting capabilities, a second benefited capability, or a second supporting capability; and the sending unit, configured to receive the information about the MUCC capability identifiers of the at least two UEs from the acquiring unit, and send the information about the MUCC capability identifiers of the at least two UEs to a radio access network node, to enable the radio access network node to select, according to the capability identifiers of the UEs, a UE having a supporting capability of the MUCC capability and a UE having a benefited capability of the MUCC capability, so that the UE having a supporting capability supports, in MUCC communication, a bearer of the UE having a benefited capability.

In a first possible implementation manner, according to the seventh aspect, the UE having a supporting capability of the MUCC capability refers to a UE having the first supporting capability, the first benefited and first supporting capabilities, or the second supporting capability; the UE having a benefited capability of the MUCC capability refers to a UE having the first benefited capability, the first benefited and first supporting capabilities, or the second benefited capability.

In a second possible implementation manner, according to the seventh aspect or the first possible implementation manner, the acquiring unit is further configured to receive attach requests or location update requests of the at least two UEs, where the attach requests or location update requests include the information about the MUCC capability identifiers of the UEs.

In a third possible implementation manner, according to the seventh aspect or the first possible implementation manner, the acquiring unit is further configured to receive capability information indications that are sent by the radio access network node and of the at least two UEs and save the capability information indications, where the capability information indications of the UEs include the information about the MUCC capability identifiers of the UEs, and the capability information indications of the UEs are generated from capability information sent to the radio access network node by the UEs after the radio access network node sends capability query information to the UEs.

In a fourth possible implementation manner, according to the second possible implementation manner or the third possible implementation manner, the sending unit is further configured to send an initial context setup request or a handover request to the radio access network node, where the initial context setup request or handover request includes the information about the MUCC capability identifiers of the at least two UEs.

In a fifth possible implementation manner, according to the seventh aspect or any one of the foregoing possible implementation manners, the core network node further includes:

a subscription determining unit, configured to receive the information about the MUCC capability identifiers of the at least two UEs from the acquiring unit, perform subscription determining on the MUCC capabilities of the at least two UEs according to subscription information of the at least two UEs, generate information about negotiated MUCC capability identifiers of the at least two UEs, and transmit the negotiated MUCC capability identifiers to the sending unit, where the negotiated MUCC capability identifiers are used to identify the MUCC capabilities of the UEs, where the sending unit is further configured to receive the negotiated MUCC capability identifiers from the subscription determining unit, and send the negotiated MUCC capability identifiers to the radio access network node, to enable the radio access network node to select, according to the negotiated capability identifiers of the UEs, a UE having a supporting capability of the MUCC capability and a UE having a benefited capability of the MUCC capability, so that the UE having a supporting capability supports, in MUCC communication, a bearer of the UE having a benefited capability.

In a sixth possible implementation manner, according to the fifth possible implementation manner, the acquiring unit is further configured to acquire updated information about the MUCC capability identifiers of the UEs, and transmit the updated information about the MUCC capability identifiers to the sending unit; and the sending unit is further configured to receive the updated information about the MUCC capability identifiers from the acquiring unit, and send the updated information about the MUCC capability identifiers to the radio access network node, to enable the radio access network node to delete, when an updated MUCC capability of a UE does not have a benefited capability and the UE is performing MUCC communication as a benefited UE, a supporting bearer of a supporting UE that supports the benefited UE; or to enable the radio access network node to delete, when an updated MUCC capability of a UE does not have a supporting capability and the UE is performing MUCC communication as a supporting UE, a supporting bearer of the supporting UE.

In a seventh possible implementation manner, according to the seventh aspect or any one of the foregoing possible implementation manners, the core network node further includes:

a priority acquiring unit, configured to acquire MUCC priority capability information of the UEs, and transmit the MUCC priority capability information of the UEs to the sending unit; where the sending unit is further configured to receive the MUCC priority capability information of the UEs from the priority acquiring unit, and send the MUCC priority capability information of the UEs to the radio access network node, to enable the radio access network node to select a UE having a low priority and a supporting capability and a UE having a high priority and a benefited capability, so that the UE having a low priority and a supporting capability supports, in MUCC communication, a bearer of the UE having a high priority and a benefited capability.

In an eighth possible implementation manner, according to the seventh aspect, the core network node further includes a processing unit, configured to: when the MUCC capability of the UE is the second supporting capability, perform one or more of the following operations:

in a case in which no IP address is allocated to the UE, allowing the UE to support a bearer of another UE;

in a case in which no PDN connection or bearer is set up for the UE, allowing the UE to support a bearer of another UE; and in a case in which security authentication is not performed on the UE, allowing the UE to support a bearer of another UE.

According to an eighth aspect, an embodiment of the present invention provides a radio access network node, which includes:

a receiving unit, configured to receive information about MUCC capability identifiers of at least two UEs that is sent by a core network node, and transmit the information about the MUCC capability identifiers of the at least two UEs to a processing unit, where the MUCC capability identifiers are used to identify MUCC capabilities of the UEs, and the MUCC capability includes: a first benefited capability, a first supporting capability, first benefited and first supporting capabilities, a second benefited capability, or a second supporting capability; and the processing unit, configured to receive the information about the MUCC capability identifiers of the at least two UEs from the receiving unit, and select, according to the capability identifiers of the UEs, a UE having a supporting capability of the MUCC capability and a UE having a benefited capability of the MUCC capability, so that the UE having a supporting capability supports, in MUCC communication, a bearer of the UE having a benefited capability.

In a first possible implementation manner, according to the eighth aspect, the receiving unit is further configured to receive an initial context setup request or a handover request sent by the core network node, where the initial context setup request or handover request includes the information about the MUCC capability identifiers of the at least two UEs.

In a second possible implementation manner, according to the eighth aspect or the first possible implementation manner, the UE having a supporting capability of the MUCC capability refers to a UE having the first supporting capability, the first benefited and first supporting capabilities, or the second supporting capability; the UE having a benefited capability of the MUCC capability refers to a UE having the first benefited capability, the first benefited and first supporting capabilities, or the second benefited capability.

In a third possible implementation manner, according to the eighth aspect or the first possible implementation manner or the second possible implementation manner, the receiving unit is further configured to receive information about negotiated MUCC capability identifiers of the at least two UEs that is generated after the core network node performs, according to subscription information of the at least two UEs, subscription determining on the MUCC capabilities of the at least two UEs, and transmit the information about the negotiated MUCC capability identifiers to the processing unit, where the negotiated MUCC capability identifiers are used to identify the MUCC capabilities of the UEs; and the processing unit is further configured to receive the information about the negotiated MUCC capability identifiers from the receiving unit, and select, according to the negotiated capability identifiers of the at least two UEs, a UE having a supporting capability of the MUCC capability and a UE having a benefited capability of the MUCC capability, so that the UE having a supporting capability supports, in MUCC communication, a bearer of the UE having a benefited capability.

In a fourth possible implementation manner, according to the third possible implementation manner, the receiving unit is further configured to receive updated information about the MUCC capability identifiers of the UEs that is sent by the core network node, and transmit the updated information about the MUCC capability identifiers to the processing unit; and the processing unit is further configured to: receive the updated information about the MUCC capability identifiers from the receiving unit; and when an updated MUCC capability of a UE does not have a benefited capability and the UE is performing MUCC communication as a benefited UE, delete a supporting bearer of a supporting UE that supports the benefited UE; or when an updated MUCC capability of a UE does not have a supporting capability and the UE is performing MUCC communication as a supporting UE, delete a supporting bearer of the supporting UE.

In a fifth possible implementation manner, according to the eighth aspect or any one of the foregoing possible implementation manners, the receiving unit is further configured to receive MUCC priority capability information of the at least two UEs that is sent by the core network node, and transmit the MUCC priority capability information to the processing unit; and the processing unit is further configured to receive the MUCC priority capability information from the receiving unit, and select a UE having a low priority and a supporting capability and a UE having a high priority and a benefited capability, so that the UE having a low priority and a supporting capability supports, in MUCC communication, a bearer of the UE having a high priority and a benefited capability.

In a sixth possible implementation manner, according to the eighth aspect, when the MUCC capability of the UE is the second supporting capability, the processing unit is further configured to keep the UE in an RRC connected state.

According to a ninth aspect, an embodiment of the present invention provides a UE, which includes:

a sending unit, configured to send information about a MUCC capability identifier of the UE to a core network node, to enable the core network node to send the information about the MUCC capability identifiers of at least two such UEs to a radio access network node, so as to enable the radio access network node to select, according to the capability identifiers of the UEs, a UE having a supporting capability and a UE having a benefited capability of the MUCC capability, so that the UE having a supporting capability supports, in MUCC communication, a bearer of the UE having a benefited capability, where the MUCC capability identifiers are used to identify the MUCC capabilities of the UEs, and the MUCC capability includes: a first benefited capability, a first supporting capability, first benefited and first supporting capabilities, a second benefited capability, or a second supporting capability.

In a first possible implementation manner, according to the ninth aspect, the UE having a supporting capability of MUCC capabilities refers to a UE having the first supporting capability, the first benefited and first supporting capabilities, or the second supporting capability; the UE having a benefited capability of the MUCC capability refers to a UE having the first benefited capability, the first benefited and first supporting capabilities, or the second benefited capability.

In a second possible implementation manner, according to the ninth aspect or the first possible implementation manner, the sending unit is further configured to send an attach request or a location update request to the core network node, where the attach request or location update request includes the information about the MUCC capability identifier of the UE.

In a third possible implementation manner, according to the ninth aspect or any one of the foregoing possible implementation manners, the sending unit is further configured to send updated information about the MUCC capability identifiers of the UEs to the core network node, to enable the core network node to send the updated information about the MUCC capability identifiers of the UEs to the radio access network node, so as to enable the radio access network node to delete, when an updated MUCC capability of a UE does not have a benefited capability and the UE is performing MUCC communication as a benefited UE, a supporting bearer of a supporting UE that supports the benefited UE; or so as to enable the radio access network node to delete, when an updated MUCC capability of a UE does not have a supporting capability and the UE is performing MUCC communication as a supporting UE, a supporting bearer of the supporting UE.

In a fourth possible implementation manner, according to the ninth aspect or any one of the foregoing possible implementation manners, the sending unit is further configured to send MUCC priority capability information of the UE to the core network node, to enable the core network node to send the MUCC priority capability information of the UE to the radio access network node, so as to enable the radio access network node to select a UE having a low priority and a supporting capability and a UE having a high priority and a benefited capability, so that the UE having a low priority and a supporting capability supports, in MUCC communication, a bearer of the UE having a high priority and a benefited capability.

According to a tenth aspect, an embodiment of the present invention provides a system for multiple users cooperative communication, which includes the core network node according to any one of the foregoing aspects or implementation manners, the radio access network node according to any one of the foregoing, and the UE according to any one of the foregoing.

According to an eleventh aspect, an embodiment of the present invention provides a radio access network node, which includes:

a sending unit, configured to send information about a MUCC capability identifier of the radio access network node to a core network node and a UE, so that the core network node and the UE initiate MUCC communication when the MUCC capability identifier of the radio access network node indicates that the radio access network node has a MUCC capability, where the MUCC capability identifier of the radio access network node is used to indicate that the radio access network node has a MUCC capability.

In a first possible implementation manner, with reference to the eleventh aspect, the MUCC capability identifier of the radio access network node further indicates that the radio access network node does not have a MUCC capability, so that the core network node and the UE skip initiating MUCC communication when the MUCC capability identifier of the radio access network node indicates that the radio access network node does not have a MUCC processing capability.

According to a twelfth aspect, an embodiment of the present invention provides a device for multiple users cooperative communication, which includes:

a receiving unit, configured to receive information about a MUCC capability identifier of a radio access network node that is sent by the radio access network node, and transmit the information about the MUCC capability identifier of the radio access network node to a processing unit, where the MUCC capability identifier of the radio access network node is used to indicate that the radio access network node has a MUCC capability; and the processing unit, configured to receive the information about the MUCC capability identifier of the radio access network node from the receiving unit, and initiate MUCC communication when the MUCC capability identifier of the radio access network node indicates that the radio access network node has a MUCC capability.

In the first possible implementation manner, with reference to the twelfth aspect, the MUCC capability identifier of the radio access network node further indicates that the radio access network node does not have a MUCC capability, and the processing unit is further configured to skip initiating MUCC communication when the MUCC capability identifier of the radio access network node indicates that the radio access network node does not have a MUCC capability.

In a second possible implementation manner, with reference to the twelfth aspect or the first possible implementation manner, the device for multiple users cooperative communication is a UE or a core network node.

According to a thirteenth aspect, an embodiment of the present invention provides a system for multiple users cooperative communication, which includes:

the foregoing radio access network node, the core network node according to any one of the foregoing, and the device for multiple users cooperative communication according to any one of the foregoing.

According to a fourteenth aspect, an embodiment of the present invention provides a radio access network node, which includes:

a receiving unit, configured to receive information about a MUCC capability identifier of a core network node that is sent by the core network node, and transmit the information about the MUCC capability identifier of the core network node to a processing unit, where the MUCC capability identifier of the core network node is used to indicate that the core network node has a MUCC capability; and the processing unit, configured to: receive the information about the MUCC capability identifier of the core network node from the receiving unit, and when the MUCC capability identifier of the core network node indicates that the core network node has a MUCC capability, initiate a MUCC operation on a UE that has registered with the core network node.

In a first possible implementation manner, with reference to the fourteenth aspect, the MUCC capability identifier of the core network node further indicates that the core network node does not have a MUCC capability, and the processing unit is further configured to skip initiating a MUCC operation on a UE that has registered with the core network node when the MUCC capability identifier of the core network node indicates that the core network node does not have a MUCC capability.

In a second possible implementation manner, with reference to the fourteenth aspect or the first possible implementation manner, exemplarily, the receiving unit is further configured to receive the information about the MUCC capability identifier of the core network node by using an S1 setup response message or a core network node configuration update message.

According to a fifteenth aspect, an embodiment of the present invention provides a system for multiple users cooperative communication, which includes: the radio access network node according to any one of the foregoing aspects or implementation manners and a core network node.

For the method, device and system for multiple users cooperative communication provided in the embodiments of the present invention, a network device acquires information about MUCC capability identifiers of different UEs, and selects, according to the capability identifiers of the UEs, a UE having a supporting capability and a UE having a benefited capability, so that the UE having a supporting capability supports, in MUCC communication, a bearer of the UE having a benefited capability. This solves a problem in the prior art that a network device is incapable of selecting different UEs according to different MUCC capabilities of UEs to perform proper multiple users cooperative communication.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1a is a flowchart of a method for multiple users cooperative communication according to an embodiment of the present invention;

FIG. 1b is a flowchart of another method for multiple users cooperative communication according to an embodiment of the present invention;

FIG. 1c is a flowchart of another method for multiple users cooperative communication according to an embodiment of the present invention;

FIG. 2a is a flowchart of another method for multiple users cooperative communication according to an embodiment of the present invention;

FIG. 2b is a flowchart of another method for multiple users cooperative communication according to an embodiment of the present invention;

FIG. 3 is a flowchart of another method for multiple users cooperative communication according to an embodiment of the present invention;

FIG. 4 is a flowchart of another method for multiple users cooperative communication according to an embodiment of the present invention;

FIG. 7A1 is a structural diagram of a core network node according to an embodiment of the present invention;

FIG. 7A2 is a structural diagram of another core network node according to an embodiment of the present invention;

DETAILED DESCRIPTION

Figure 5:
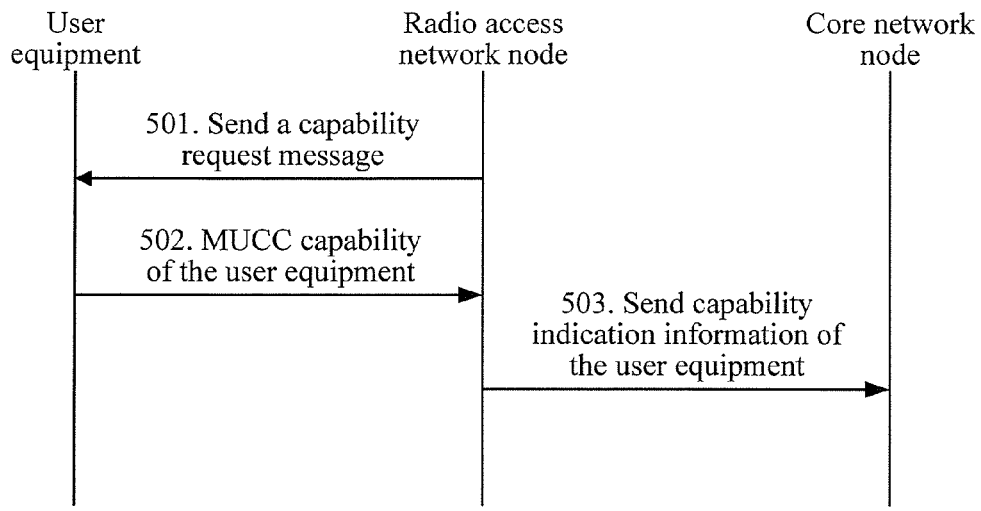
FIG. 5 is a flowchart of acquiring information about a MUCC capability identifier of a UE by a core network node according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A method provided in an embodiment of the present invention is applicable to various communications systems, for example, a Global System for Mobile Communications (GSM) network, a general packet radio service (GPRS)

network, a Wideband Code Division Multiple Access (WCDMA) network, a CDMA-2000 network, a Time Division-Synchronous Code Division Multiple Access (TD-SCDMA) network or a Worldwide Interoperability for Microwave Access (WiMAX) network.

A System Architecture Evolution (SAE)/Long Term Evolution (LTE) network is used as an example for description below, and certainly the present invention is not limited to this scenario.

Exemplarily, a SAE/LTE network may include a radio access network node (for example, an eNodeB), a core network node (for example, a mobility management entity MME), a serving gateway (S-GW), and a packet data network gateway (P-GW).

The radio access network node is used to provide an air interface to a UE, so that the UE accesses the SAE/LTE network. The core network node is a control plane entity and is used to be responsible for a core network control function of the SAE/LTE network and execute mobility management and session management for the UE. The serving gateway and the packet data network gateway may be user plane entities and are used to provide a data transmission service to the UE.

After a UE is powered on and attached to the SAE/LTE network, the core network node and/or the packet data network gateway sets up, for the UE, one or more evolved packet system (EPS) bearers as system bearers, so that the UE can communicate with a third party by using the EPS bearer that is set up, where the third party may be another UE, a server of a content provider, a server of a service provider or the like. Every EPS bearer may include a radio bearer between the UE and the radio access network node, an S1 bearer that is used for the UE and between the radio access network node and the serving gateway, and an S5/S8 bearer that is used for the UE and between the serving gateway and the packet data network gateway. The S1 bearer is also referred to as a bearer between the radio access network node and the core network node in the SAE/LTE network.

The UE may further have, in addition to a cellular communications technology in the foregoing, some short range communications technology capabilities, for example, a Long Term Evolution-Device to Device (LTE-D2D) technology or a WiFi technology based on IEEE 802.11. By using an example in which the cellular technology is SAE/LTE and the short range communications technology is WiFi, in a scenario of a single network node and multiple users cooperative communication, or a scenario of multiple users cooperative communication (MUCC) as named, when at least two UEs (UE) have a characteristic of supporting both WiFi and LTE, to improve reliability and a throughput, a MUCC relationship may be set up between the at least two UEs. That is, one UE of the at least two UEs needs to send or receive data, and another UE except the one UE may provide support and assist the one UE in communication. In the embodiment of the present invention, the one UE may be named a benefited UE, a served UE, or an assisted UE, whereas the other UE except the one UE is named a supporting UE, a serving UE, or an assisting UE. The naming of the foregoing UEs is only an example of the present invention, and in the embodiment of the present invention, the naming of the UEs includes, but is not limited to, the foregoing naming example.

By using a supporting UE and a benefited UE as an example, the benefited UE is a final sending party of uplink data or a final receiving party of downlink data (from the perspective of a cellular technology). For a bearer, there is usually only one benefited UE. The supporting UE is a UE that is used to assist the benefited UE in relaying data. For a bearer of the benefited UE, there may be multiple supporting UEs.

By using a supporting UE and a benefited UE as an example, the concepts of the benefited UE and the supporting UE are viewed from the perspective of a bearer of the benefited UE. For example, a UE1 and a UE2 form MUCC and can assist each other in communication; in this way, from the perspective of a bearer of the UE1, the UE2 can support the bearer of the UE1, and therefore the UE1 is the benefited UE, whereas the UE2 is the supporting UE. Meanwhile, the UE1 may also support a bearer of the UE2, and therefore from the perspective of this bearer of the UE2, the UE2 is the benefited UE, whereas the UE1 is the supporting UE.

By using a supporting UE and a benefited UE as an example, when the foregoing UEs are located within a same range for short range connection, a network may separately send downlink data to the foregoing supporting UE and benefited UE. When the network sends the downlink data to the supporting UE, the supporting UE that receives the data then sends the data to the benefited UE by means of short range communication (for example, WiFi). Certainly, the data may also reach the benefited UE directly, and the benefited UE performs data merging. Similarly, uplink data of the benefited UE may also be sent to the network by means of the benefited UE or another supporting UE, and the network then performs data merging, so as to accomplish cooperative communication between the UEs.

By means of transmission assisted by the supporting UE, reliability and a throughput of communication of the benefited UE can be improved.

MUCC communication is based on a bearer. For a bearer, if a bearer of a first UE is supported by another UE, the first UE is the benefited UE, and the another UE is the supporting UE.

Refer to FIG. 1a, which is a flowchart of a method for multiple users cooperative communication according to an embodiment of the present invention. As shown in the figure, the method may include the following steps:

101a: A core network node acquires information about MUCC capability identifiers of at least two UEs, where the MUCC capability identifiers are used to identify MUCC capabilities of the UEs, and the MUCC capability includes: a first benefited capability, a first supporting capability, first benefited and first supporting capabilities, a second benefited capability, or a second supporting capability.

Exemplarily, the first benefited capability may indicate that a UE can act as a benefited UE and can also act as a common UE to perform communication. The first supporting capability may indicate that a UE can act as a supporting UE and can also act as a common UE to perform communication. The first benefited and first supporting capabilities may represent that a UE can act as a supporting UE, and can also act as a benefited UE, and can further act as a common UE to perform communication. The second benefited capability represents that a UE can act only as a benefited UE to perform MUCC communication, and cannot act as a supporting UE or a common UE. The second supporting capability represents that a UE can act only as a supporting UE to perform MUCC communication, and cannot act as a benefited UE or a common UE. The MUCC capabilities can be represented by using several bits of information.

Exemplarily, the acquiring, by a core network node, information about MUCC capability identifiers of at least two UEs may include:

receiving, by the core network node, attach requests or location update requests of the at least two UEs, where the attach requests or location update requests include the information about the MUCC capability identifiers of the UEs;

or may include: receiving, by the core network node, capability information indications that are sent by a radio access network node and of the at least two UEs and saving the capability information indications, where the capability information indications of the UEs include the information about the MUCC capability identifiers of the UEs, and the capability information indications of the UEs are generated from capability information sent to the radio access network node by the UEs after the radio access network node sends capability query information to the UEs.

102a: The core network node sends the information about the MUCC capability identifiers of the at least two UEs to a radio access network node, to enable the radio access network node to select, according to the capability identifiers of the UEs, a UE having a supporting capability of the MUCC capability and a UE having a benefited capability of the MUCC capability, so that the UE having a supporting capability supports, in MUCC communication, a bearer of the UE having a benefited capability.

Exemplarily, the sending, by the core network node, the information about the MUCC capability identifiers of the at least two UEs to a radio access network node may include:

sending, by the core network node, an initial context setup request or a handover request to the radio access network node, where the initial context setup request or handover request includes the information about the MUCC capability identifiers of the at least two UEs.

Exemplarily, the UE having a supporting capability of the MUCC capability refers to a UE having the first supporting capability, the first benefited and first supporting capabilities, or the second supporting capability; the UE having a benefited capability in the MUCC capabilities refers to a UE having the first benefited capability, the first benefited and first supporting capabilities, or the second benefited capability.

In the method for multiple users cooperative communication provided in this embodiment of the present invention, a core network node sends acquired MUCC capabilities of different UEs to a radio access network node, to enable the radio access network node to select, according to capability identifiers of the UEs, a UE having a supporting capability and a UE having a benefited capability, so that the UE having a supporting capability supports, in MUCC communication, a bearer of the UE having a benefited capability. This solves a problem in the prior art that a radio access network node is incapable of selecting different UEs according to different MUCC capabilities of UEs to perform proper multiple users cooperative communication.

It should be noted that, step 101a and step 102a may be implemented by means of two UE access processes. For example, step 101a is implemented when a UE initiates an attach request or a location update request and accesses a network; step 102a is implemented when the UE initiates a service request next time and accesses the network next time. The two steps are not necessarily implemented in one UE access process.

Furthermore, the core network node may further perform subscription determining on the MUCC capabilities of the at least two UEs according to subscription information of the at least two UEs, and generate information about negotiated MUCC capability identifiers of the at least two UEs, where the negotiated MUCC capability identifiers are also used to identify the MUCC capabilities of the UEs; and then the core network node sends the information about the negotiated MUCC capability identifiers of the at least two UEs to the radio access network node, to enable the radio access network node to select, according to the negotiated capability identifiers of the UEs, a UE having a supporting capability of the MUCC capability and a UE having a benefited capability of the MUCC capability, so that the UE having a supporting capability supports, in MUCC communication, a bearer of the UE having a benefited capability.

Furthermore, the core network node may further acquire updated information about the MUCC capability identifiers of the UEs, and then send the updated information about the MUCC capability identifiers of the UEs to the radio access network node, to enable the radio access network node to delete, when an updated MUCC capability of a UE does not have a benefited capability and the UE is performing MUCC communication as a benefited UE, a supporting bearer of a supporting UE that supports the benefited UE, or to enable the radio access network node to delete, when an updated MUCC capability of a UE does not have a supporting capability and the UE is performing MUCC communication as a supporting UE, a supporting bearer of the supporting UE. The updated MUCC capability identifier of the UE may be obtained in a way in which the UE changes the MUCC capability of the UE, and may also be obtained in a way in which the core network node changes the subscription information of the UE.

Furthermore, the core network node may further acquire MUCC priority capability information of the at least two UEs, and then send the MUCC priority capability information of the at least two UEs to the radio access network node, to enable the radio access network node to select a UE having a low priority and a supporting capability and a UE having a high priority and a benefited capability, so that the UE having a low priority and a supporting capability supports, in MUCC communication, a bearer of the UE having a high priority and a benefited capability.

The acquiring, by the core network node, MUCC priority capability information of the at least two UEs may include:

setting, by the core network node, the MUCC priority capability information for the at least two UEs; or receiving, by the core network node, the MUCC priority capability information of the UEs that is sent by the at least two UEs.

Furthermore, a UE whose MUCC capability is the second supporting capability may be referred to as a publicly benefiting UE in this embodiment of the present invention. Such a publicly benefiting UE can act only as a supporting UE to support other benefited UEs, and cannot act as a common UE or a benefited UE. Such a UE may be deployed by an operator or deployed by an enterprise/individual, for example, being installed in a bus, a metro, and a business district, so that other UEs can improve a throughput or reliability by means of the "publicly benefiting UE". For such a "publicly benefiting UE", initiation of a service request may be skipped; setup of a PDN connection or bearer, including a default bearer, may be skipped; access may be initiated without a subscriber identity module (SIM) card or a universal integrated circuit card (UICC); no identifier information and/or security information may be carried during access to a network. Exemplarily, when the MUCC capability of the UE is the second supporting capability, the method further includes one or more of the following:

in a case in which no IP address is allocated to the UE, allowing, by the core network node, the UE to support a bearer of another UE;

in a case in which no PDN connection or bearer is set up for the UE, allowing, by the core network node, the UE to support a bearer of another UE; and in a case in which security authentication is not performed on the UE, allowing, by the core network node, the UE to support a bearer of another UE.

Refer to FIG. 1b, which is a flowchart of another method for multiple users cooperative communication according to an embodiment of the present invention. As shown in the figure, the method may include the following steps:

101b: A radio access network node receives MUCC capability identifiers of at least two UEs that are sent by a core network node, where the MUCC capability identifiers are used to identify MUCC capabilities of the UEs, and the MUCC capability includes: a first benefited capability, a first supporting capability, first benefited and first supporting capabilities, a second benefited capability, or a second supporting capability.

Exemplarily, the receiving, by a radio access network node, information about MUCC capability identifiers of at least two UEs sent by a core network node may include:

receiving, by the radio access network node, an initial context setup request or a handover request sent by the core network node, where the initial context setup request or handover request includes the information about the MUCC capability identifiers of the at least two UEs.

102b: The radio access network node selects, according to the capability identifiers of the UEs, a UE having a supporting capability of the MUCC capability and a UE having a benefited capability of the MUCC capability, so that the UE having a supporting capability supports, in MUCC communication, a bearer of the UE having a benefited capability.

Exemplarily, the UE having a supporting capability of the MUCC capability refers to a UE having the first supporting capability, the first benefited and first supporting capabilities, or the second supporting capability; the UE having a benefited capability of the MUCC capability refers to a UE having the first benefited capability, the first benefited and first supporting capabilities, or the second benefited capability.

In the method for multiple users cooperative communication provided in this embodiment of the present invention, by receiving information about MUCC capability identifiers of different UEs that is sent by a core network node, a radio access network node can select, according to the capability identifiers of the UEs, a UE having a supporting capability and a UE having a benefited capability, so that the UE having a supporting capability supports, in MUCC communication, a bearer of the UE having a benefited capability, thereby improving quality and a success rate of multiple users cooperative communication. This solves a problem in the prior art that a radio access network node is incapable of selecting different UEs according to different MUCC capabilities of UEs to perform proper multiple users cooperative communication.

Furthermore, the radio access network node may further receive information about negotiated MUCC capability identifiers of the at least two UEs that is generated after the core network node performs, according to subscription information of the at least two UEs, subscription determining on the MUCC capabilities of the at least two UEs, where the negotiated MUCC capability identifiers are used to identify the MUCC capabilities of the UEs; and then the radio access network node selects, according to the negotiated capability identifiers of the at least two UEs, a UE having the MUCC capability and a UE having a benefited capability of the MUCC capability, so that the UE having a supporting capability supports, in MUCC communication, a bearer of the UE having a benefited capability.

Furthermore, the radio access network node may further receive updated information about the MUCC capability identifiers of the UEs that is sent by the core network node.

The method may further include:

if an updated MUCC capability of a UE does not have a benefited capability and the UE is performing MUCC communication as a benefited UE, deleting, by the radio access network node, a supporting bearer of a supporting UE that supports the benefited UE; or if an updated MUCC capability of a UE does not have a supporting capability and the UE is performing MUCC communication as a supporting UE, deleting, by the radio access network node, a supporting bearer of the supporting UE.

Furthermore, the radio access network node may further receive MUCC priority capability information of the at least two UEs that is sent by the core network node, and then select a UE having a low priority and a supporting capability and a UE having a high priority and a benefited capability, so that the UE having a low priority and a supporting capability supports, in MUCC communication, a bearer of the UE having a high priority and a benefited capability.

Furthermore, when the MUCC capability of the UE is the second supporting capability, the radio access network node may keep the UE in an RRC connected state.

For example, the radio access network node does not release an RRC connection of a UE having the second supporting capability, so that the UE having the second supporting capability is kept in the RRC connected state; or the radio access network node does not set up an S1 connection, that is, a UE having a supporting capability is kept in the RRC connected state.

A method for multiple users cooperative communication according to another embodiment of the present invention, referring to FIG. 1c, includes:

101c: At least two UEs send information about MUCC capability identifiers of the UEs to a core network node, to enable the core network node to send the information about the MUCC capability identifiers of the at least two UEs to a radio access network node, so as to enable the radio access network node to select, according to the capability identifiers of the UEs, a UE having a supporting capability and a UE having a benefited capability of the MUCC capability, so that the UE having a supporting capability supports, in MUCC communication, a bearer of the UE having a benefited capability, where the MUCC capability identifiers are used to identify the MUCC capabilities of the UEs, and the MUCC capability includes: a first benefited capability, a first supporting capability, first benefited and first supporting capabilities, a second benefited capability, or a second supporting capability.

Exemplarily, the sending, by UE, the information about the MUCC capability identifier of the UE to the core network node may include:

sending, by the UE, an attach request or a location update request to the core network node, where the attach request or location update request includes the information about the MUCC capability identifier of the UE.

In the method for multiple users cooperative communication provided in this embodiment of the present invention, UEs send information about MUCC capability identifiers of the UEs to a core network node, enabling the core network node to send MUCC capabilities of the UEs to a radio access network node, so as to enable the radio access network node to select, according to the capability identifiers of the UEs, a UE having a supporting capability and a UE having a benefited capability, so that the UE having a supporting capability supports, in MUCC communication, a bearer of the UE having a benefited capability, thereby improving quality and a success rate of multiple users cooperative communication. This solves a problem in the prior art that a radio access network node is incapable of selecting different UEs according to different MUCC capabilities of UEs to perform proper multiple users cooperative communication.

A method for multiple users cooperative communication according to another embodiment of the present invention, referring to FIG. 2a, includes:

201a: A radio access network node sends information about a MUCC capability identifier of the radio access network node to a core network node and a UE, so that the core network node and the UE initiate MUCC communication when the MUCC capability identifier of the radio access network node indicates that the radio access network node has a MUCC capability, where the MUCC capability identifier of the radio access network node is used to indicate that the radio access network node has a MUCC capability.

Exemplarily, the radio access network node may notify the core network node of the information about the MUCC capability identifier of the radio access network node by using an S1 setup request or an eNB Configuration Update message.

The radio access network node may further deliver the information about the MUCC capability identifier of the radio access network node to the UE by using a broadcast message (for example, a system information block, SIB), and may also send the information about the MUCC capability identifier of the radio access network node to the UE by using a form such as an RRC message for the UE.

Furthermore, the MUCC capability identifier of the radio access network node further indicates that the radio access network node does not have a MUCC capability, so that the core network node and the UE skip initiating MUCC communication when the MUCC capability identifier of the radio access network node indicates that the radio access network node does not have a MUCC processing capability.

In the method for multiple users cooperative communication provided in this embodiment of the present invention, a radio access network node sends information about a MUCC capability identifier of the radio access network node to a core network node and a UE, so that the core network node and the UE perform proper multiple users cooperative communication according to a different MUCC capability of the radio access network node, thereby improving quality and a success rate of multiple users cooperative communication.

A method for multiple users cooperative communication according to another embodiment of the present invention, referring to FIG. 2b, includes:

201b: A first device receives information about a MUCC capability identifier of a radio access network node that is sent by the radio access network node, where the MUCC capability identifier of the radio access network node is used to indicate that the radio access network node has a MUCC capability.

Exemplarily, the first device may be a UE or a core network node. The radio access network node may notify the core network node of the information about the MUCC capability identifier of the radio access network node by using an S1 setup request or an eNB Configuration Update message.

The radio access network node may further deliver the information about the MUCC capability identifier of the radio access network node to the UE by using a broadcast message (for example, SIB), and may also send the information about the MUCC capability identifier of the radio access network node to the UE by using a form such as an RRC message for the UE.

202b: If the MUCC capability identifier of the radio access network node indicates that the radio access network node has a MUCC capability, the first device initiates MUCC communication.

Furthermore, the MUCC capability identifier of the radio access network node further indicates that the radio access network node does not have a MUCC capability, and the method further includes:

skipping initiating, by the first device, MUCC communication if the MUCC capability identifier of the radio access network node indicates that the radio access network node does not have a MUCC capability.

For example, when the first device is a core network node, in a MUCC process controlled by the core network node, the core network node does not initiate a process of multiple users cooperative communication for the radio access network node if the radio access network node does not have a MUCC capability, that is, cannot process MUCC communication.

For another example, when the first device is a UE, the UE may initiate a communication operation of MUCC if the radio access network node has a MUCC capability, that is, can process MUCC communication; the UE does not initiate a communication operation of MUCC if the radio access network node does not have a MUCC capability, that is, cannot process MUCC communication. For example, after a benefited UE receives an information identifier indicating that the radio access network node has a MUCC capability, the UE may initiate a process of discovering a supporting UE, so as to initiate multiple users cooperative communication; after the benefited UE receives an information identifier indicating that the radio access network node does not have a MUCC capability, the UE does not initiate a process of discovering a supporting UE, and multiple users cooperative communication cannot be initiated.

In the method for multiple users cooperative communication provided in this embodiment of the present invention, a core network node acquires information about a MUCC capability identifier of a radio access network node, and performs proper multiple users cooperative communication according to a different MUCC capability of the radio access network node, thereby improving quality and a success rate of multiple users cooperative communication.

A method for multiple users cooperative communication according to another embodiment of the present invention, referring to FIG. 3, includes:

301: A radio access network node receives information about a MUCC capability identifier of a core network node that is sent by the core network node, where the MUCC capability identifier of the core network node is used to indicate that the core network node has a MUCC capability.

Exemplarily, the receiving, by a radio access network node, information about a MUCC capability identifier of a core network node that is sent by the core network node may include:

receiving, by the radio access network node, the information about the MUCC capability identifier of the core network node by using an S1 setup response message or a core network node configuration update message.

302: If the MUCC capability identifier of the core network node indicates that the core network node has a MUCC capability, the radio access network node initiates a MUCC operation on a UE that has registered with the core network node.

Furthermore, the MUCC capability identifier of the core network node further indicates that the core network node does not have a MUCC capability, and the method further includes:

skipping initiating, by the radio access network node, a MUCC operation on a UE that has registered with the core network node if the MUCC capability identifier of the core network node indicates that the core network node does not have a MUCC capability.

In the method for multiple users cooperative communication provided in this embodiment of the present invention, a core network node sends information about a MUCC capability identifier of the core network node to a radio access network node, so that the radio access network node performs proper multiple users cooperative communication according to a different MUCC capability of the core network node, thereby improving quality and a success rate of multiple users cooperative communication.

The method embodiments shown in FIG. 1 are described below by using specific embodiments. Refer to FIG. 4, which includes:

401: A UE sends an attach request or a location update request to a core network node, where the attach request or location update request includes information about a MUCC capability identifier of the UE.

Optionally, a core network node may acquire and save the information about the MUCC capability identifier of the UE, and send the information about the MUCC capability identifier to a radio access network node during access of the UE next time, thereby avoiding exchange of the information about the MUCC capability identifier of the UE on an air interface each time. Referring to FIG. 5, a process in which a core network node acquires information about a MUCC capability identifier of a UE may further include:

501: A radio access network node sends a capability request message to the UE.

Exemplarily, the radio access network node may directly send the capability request message to the UE by using an air interface. Next, an eNB sends the capability request message to an MME by using an UE capability information indication (UE Capability Info Indication). As long as the MME saves the capability information, the MME may transfer the capability information to the eNB by using the foregoing initial context setup request (Initial Context Setup Request) or handover request (Handover Request) during access of the UE next time, thereby avoiding exchange of the capability information on the air interface each time.

502: The UE sends a MUCC capability of the UE to the radio access network node by using capability information.

503: The radio access network node sends capability indication information of the UE to the core network node.

Exemplarily, the capability indication information of the UE includes the information about the MUCC capability identifier of the UE, and the core network node saves the information about the MUCC capability identifier of the UE.

402: The core network node performs subscription determining on the MUCC capability of the UE according to subscription information of the UE, and generates a negotiated MUCC capability of the UE.

Exemplarily, the core network node may acquire the subscription information of the UE from a subscription database, and then performs subscription determining on the MUCC capability of the UE according to the subscription information of the UE. For example, an intersection set between the subscription information of the UE and the information about the MUCC capability identifier of the UE may be acquired to generate the negotiated MUCC capability of the UE. For example, the subscription of the UE allows the UE to act as a benefited UE, but does not allow the UE to act as a supporting UE, whereas the information about the MUCC capability identifier of the UE that is acquired by the core network node is first benefited and first supporting capabilities. In this case, the negotiated MUCC capability of the UE that is generated by the core network node is a first benefited capability. In other embodiments of the present invention, the information about the MUCC capability identifier of the UE may be capability information of the UE, and may also be a negotiated MUCC capability after negotiation with the subscription information.

403: The core network node sends an initial context setup request to a radio access network node, where the initial context setup request includes information about a negotiated MUCC capability identifier of the UE.

404: The radio access network node selects, according to the negotiated capability identifiers of at least two such UEs, a UE having a supporting capability of the MUCC capability and a UE having a benefited capability of the MUCC capability, so that the UE having a supporting capability supports, in MUCC communication, a bearer of the UE having a benefited capability.

Exemplarily, for a UE having a benefited capability, the radio access network node determines, according to QoS information of a bearer of the UE, whether to support the bearer. If it is determined to support the bearer, the radio access network node may select a UE having a supporting capability to act as a supporting UE for the UE. Preferably, the radio access network node may select a UE having the best wireless connection quality and a supporting capability to act as the supporting UE for the UE.

For a UE having a supporting capability, the radio access network node may select the UE to act as a supporting UE for a UE having a benefited capability. Preferably, the radio access network node may select a UE having the best wireless connection quality and a supporting capability to act as a supporting UE for a benefited UE.

Preferably, the radio access network node may further acquire MUCC priority capability information of the UEs, so that the radio access network node may further perform processing on MUCC communication according to MUCC priorities of the UEs. For example, the radio access network node may select a UE having a low MUCC priority and a supporting capability to support a bearer of a UE having a benefited capability and a high MUCC priority, but cannot select a UE having a high MUCC priority and a supporting capability to support a bearer of a UE having a benefited capability and a low MUCC priority. The MUCC priority of the UE may be set by the radio access network node, and may also be set by the core network node (for example, determined by means of subscription), and then is sent to the radio access network node, and may further be sent by the UE to the core network node as a part of the information about the MUCC capability identifier, and then is sent by the core network node to the radio access network node. A basis on which the MUCC priority of the UE is set may be selected according to a requirement, and is not limited in this embodiment of the present invention. It should be noted that, the foregoing high and low priorities are in a relative sense. A UE having a relatively high priority may use a UE having a relatively low priority as a supporting UE; a UE having a relatively low priority cannot use a UE having a relatively high priority as a supporting UE.

In addition, in a handover process, the information about the MUCC capability identifier of the UE may be sent from an source radio access network node to a target radio access network node. For example, the information about the MUCC capability identifier may be directly sent from the source radio access network node to the target radio access network node, or is sent from the source radio access network node to the target radio access network node by means of relay of the core network node.

In the method for multiple users cooperative communication provided in this embodiment of the present invention, by receiving MUCC capabilities that are sent by a core network node and of different UEs, a radio access network node can select, according to capability identifiers of the UEs, a UE having a supporting capability and a UE having a benefited capability, so that the UE having a supporting capability supports, in MUCC communication, a bearer of the UE having a benefited capability, thereby improving quality and a success rate of multiple users cooperative communication. This solves a problem in the prior art that a radio access network node is incapable of selecting different UEs according to different MUCC capabilities of UEs to perform proper multiple users cooperative communication.

Figure 6:
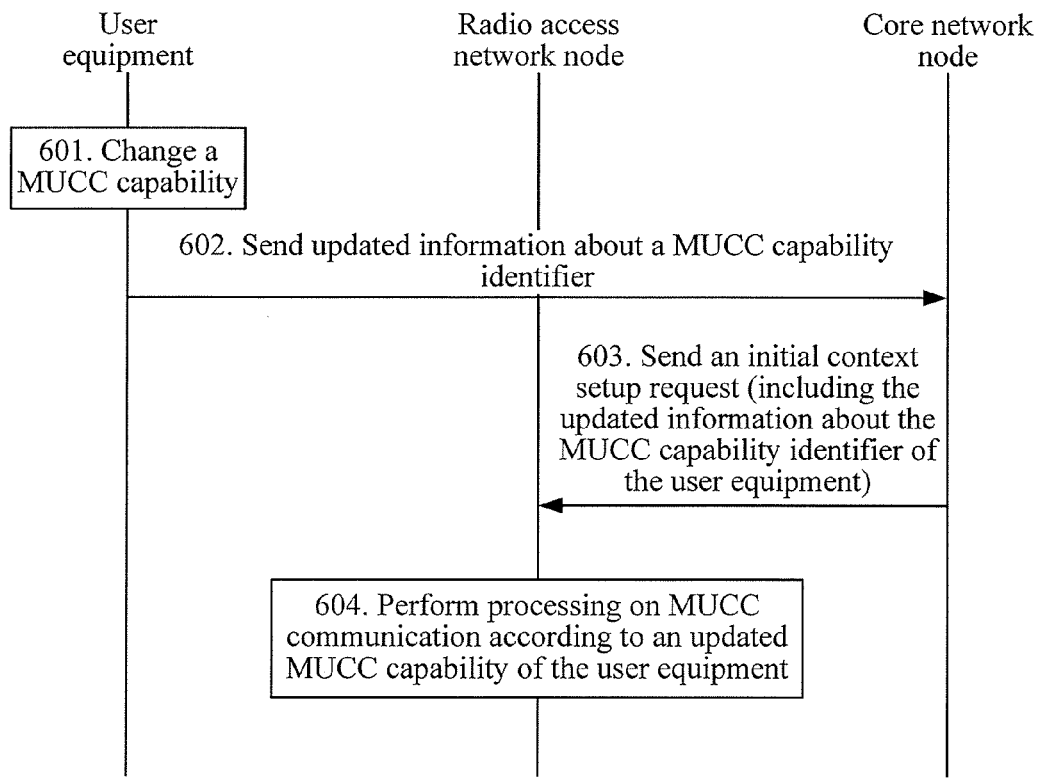
FIG. 6 is a flowchart of another method for multiple users cooperative communication according to an embodiment of the present invention.

In addition, the UE may change the MUCC capability of the UE. For example, a UE originally has the first supporting capability, which is then changed into the first benefited and first supporting capabilities, that is, the UE has both a benefited capability and a supporting capability. Alternatively, a UE originally has the first benefited and first supporting capabilities, that is, the UE has both a benefited capability and a supporting capability; to save power or for other objectives, the UE turns off the supporting capability, so that the first benefited and first supporting capabilities are changed into the first benefited capability. Preferably, the UE sends the changed MUCC capability to the core network node, and the core network node then sends changed MUCC capability identifier information of the UE to the radio access network node, so that the radio access network node performs processing on multiple users cooperative communication according to the changed MUCC capability identifier information of the UE. Referring to FIG. 6, a method may include:

601: A UE changes a MUCC capability.

602: The UE sends updated information about a MUCC capability identifier to a core network node.

Exemplarily, the UE may send the updated information about the MUCC capability identifier of the UE to the core network node by using a location update request.

603: The core network node sends an initial context setup request to a radio access network node, where the initial context setup request includes the updated information about the MUCC capability identifier of the UE.

Exemplarily, the core network node may perform, according to subscription information of the UE, subscription determining on the updated information about the MUCC capability identifier sent by the UE, and generate updated information about a negotiated MUCC capability identifier of the UE.

The core network node may also skip subscription determining, and instead directly uses the updated information about the MUCC capability identifier sent by the UE. Therefore, the updated information about the MUCC capability identifier may include the updated information about the MUCC capability identifier or the updated information about the negotiated MUCC capability identifier of the UE.

604: The radio access network node performs processing on MUCC communication according to the updated information about the MUCC capability identifier of the UE.

Exemplarily, if an updated MUCC capability of the UE does not have a benefited capability and the UE is performing MUCC communication as a benefited UE, the radio access network node deletes a supporting bearer of a supporting UE that supports the benefited UE; if there is no more active bearer after the supporting bearer of the supporting UE is deleted, the radio access network node may further shift the supporting UE into an idle state.

If an updated MUCC capability of the UE does not have a supporting capability and the UE is performing MUCC communication as a supporting UE, the radio access network node deletes a supporting bearer of the supporting UE. If there is no more active bearer after the supporting bearer of the UE is deleted, the radio access network node may further shift the UE into an idle state.

Certainly, the updated information about the MUCC capability identifier may further be generated because of a change of the subscription information. For example, original subscription of a UE allows the first benefited and first supporting capabilities, subsequently the subscription is changed to allow the first supporting capability, whereas a capability of the UE is the first benefited and first supporting capabilities. In this case, a negotiated MUCC capability is changed from the first benefited and first supporting capabilities to the first supporting capability, and the core network node also needs to send the updated information about the MUCC capability identifier to the radio access network node, so that the radio access network node performs processing on MUCC communication according to an updated MUCC capability of the UE. In this case, step 601 and step 602 are not executed, that is, when the MUCC capability of the UE is not changed, a network does not need to be notified; however, if the subscription of the UE is changed, the MUCC capability may also be changed.

In the method for multiple users cooperative communication provided in this embodiment of the present invention, by receiving updated MUCC capabilities that are sent by a core network node and of different UEs, a radio access network node can select, according to the different updated MUCC capabilities of the UEs, different UEs to perform proper multiple users cooperative communication, thereby improving quality and a success rate of multiple users cooperative communication. This solves a problem in the prior art that a radio access network node is incapable of selecting different UEs according to different MUCC capabilities of UEs to perform proper multiple users cooperative communication.

An embodiment of the present invention provides a core network node. Referring to FIG. 7A1, the core network node includes:

An acquiring unit 711 is configured to acquire information about MUCC capability identifiers of at least two UEs, and transmit the information about the MUCC capability identifiers of the at least two UEs to a sending unit, where the MUCC capability identifiers are used to identify MUCC capabilities of the UEs, and the MUCC capability includes: a first benefited capability, a first supporting capability, first benefited and first supporting capabilities, a second benefited capability, or a second supporting capability.

Exemplarily, the first benefited capability may indicate that a UE can act as a benefited UE and can also act as a common UE to perform communication. The first supporting capability may indicate that a UE can act as a supporting UE and can also act as a common UE to perform communication. The first benefited and first supporting capabilities may represent that a UE can act as a supporting UE, and can also act as a benefited UE, and can further act as a common UE to perform communication. The second benefited capability represents that a UE can act only as a benefited UE to perform MUCC communication, and cannot act as a supporting UE or ordinary common UE. The second supporting capability represents that a UE can act only as a supporting UE to perform MUCC communication, and cannot act as a benefited UE or ordinary common UE. The MUCC capabilities can be represented by using several bits of information.

Furthermore, the acquiring unit 711 is further configured to receive attach requests or location update requests of the at least two UEs, where the attach requests or location update requests include the information about the MUCC capability identifiers of the UEs.

The acquiring unit 711 is further configured to receive capability information indications that are sent by a radio access network node and of the at least two UEs and save the capability information indications, where the capability information indications of the UEs include the information about the MUCC capability identifiers of the UEs, and the capability information indications of the UEs are generated from capability information sent to the radio access network node by the UEs after the radio access network node sends capability query information to the UEs.

The sending unit 712 is configured to receive the information about the MUCC capability identifiers of the at least two UEs from the acquiring unit 711, and send the information about the MUCC capability identifiers of the at least two UEs to the radio access network node, to enable the radio access network node to select, according to the capability identifiers of the UEs, a UE having a supporting capability of the MUCC capability and a UE having a benefited capability of the MUCC capability, so that the UE having a supporting capability supports, in MUCC communication, a bearer of the UE having a benefited capability.

Exemplarily, the sending unit 712 may send the MUCC capabilities of the UEs to the radio access network node by sending an initial context setup request or a handover request to the radio access network node, where the initial context setup request or handover request includes the information about the MUCC capability identifiers of the at least two UEs.

Exemplarily, the UE having a supporting capability of the MUCC capability refers to a UE having the first supporting capability, the first benefited and first supporting capabilities, or the second supporting capability; the UE having a benefited capability of the MUCC capability refers to a UE having the first benefited capability, the first benefited and first supporting capabilities, or the second benefited capability.

Furthermore, referring to FIG. 7A2, the core network node further includes: a subscription determining unit 713, configured to receive the information about the MUCC capability identifiers of the at least two UEs from the acquiring unit 711, perform subscription determining on the MUCC capabilities of the at least two UEs according to subscription information of the at least two UEs, generate information about negotiated MUCC capability identifiers of the at least two UEs, and transmit the negotiated MUCC capability identifiers to the sending unit, where the negotiated MUCC capability identifiers are used to identify the MUCC capabilities of the UEs.

Exemplarily, the subscription determining unit 713 may acquire subscription information of a UE from a subscription database, and then performs subscription determining on a MUCC capability of the UE according to the subscription information of the UE. For example, an intersection set between the subscription information of the user and information about a MUCC capability identifier of the UE may be acquired to generate a negotiated MUCC capability of the UE. For example, the subscription information of the UE that is acquired by the subscription determining unit 713 allows the UE to act as a benefited UE, but does not allow the UE to act as a supporting UE, whereas information about a MUCC capability identifier of the UE that is acquired by the acquiring unit 711 is the first benefited and first supporting capabilities. In this case, the negotiated MUCC capability of the UE that is generated by the subscription determining unit 713 is the first benefited capability.

The sending unit 712 is further configured to receive the negotiated MUCC capability identifiers from the subscription determining unit 713, and send the negotiated MUCC capability identifiers to the radio access network node, to enable the radio access network node to select, according to the negotiated capability identifiers of the UEs, a UE having a supporting capability of the MUCC capability and a UE having a benefited capability of the MUCC capability, so that the UE having a supporting capability supports, in MUCC communication, a bearer of the UE having a benefited capability.

Furthermore, the acquiring unit 711 is further configured to acquire updated information about the MUCC capability identifiers of the UEs, and transmit the updated information about the MUCC capability identifiers to the sending unit 712.

Exemplarily, a UE may change a MUCC capability of the UE. For example, a UE originally has the first supporting capability, which is then changed into the first benefited and first supporting capabilities, that is, the UE has both a benefited capability and a supporting capability. Alternatively, a UE originally has the first benefited and first supporting capabilities, that is, the UE has both a benefited capability and a supporting capability; to save power or for other objectives, the UE turns off the supporting capability, so that the first benefited and first supporting capabilities are changed into the first benefited capability.

Exemplarily, the core network node may perform, according to the subscription information of the UEs, subscription determining on the updated information about the MUCC capability identifiers sent by the UEs, and generate updated information about the negotiated MUCC capability identifiers of the UEs.

The core network node may also skip subscription determining, and instead directly uses the updated information about the MUCC capability identifiers sent by the UEs. Therefore, the updated information about the MUCC capability identifiers may include the updated information about the MUCC capability identifiers or the updated information about the negotiated MUCC capability identifiers of the UEs.

Certainly, the updated information about the MUCC capability identifiers may further be generated because of a change of the subscription information. For example, original subscription of a UE allows the first benefited and first supporting capabilities, subsequently the subscription is changed to allow the first supporting capability, whereas a capability of the UE is the first benefited and first supporting capabilities. In this case, a negotiated MUCC capability is changed from the first benefited and first supporting capabilities to the first supporting capability, and the core network node also needs to send updated information about a MUCC capability identifier to the radio access network node, so that the radio access network node performs processing on MUCC communication according to an updated MUCC capability of the UE. In this case, step 601 and step 602 are not executed, that is, when the MUCC capability of the UE is not changed, a network does not need to be notified; however, if the subscription of the UE is changed, the MUCC capability may also be changed.

The sending unit 712 is further configured to receive the updated information about the MUCC capability identifiers from the acquiring unit 711, and send the updated information about the MUCC capability identifiers to the radio access network node, to enable the radio access network node to delete, when an updated MUCC capability of a UE does not have a benefited capability and the UE is performing MUCC communication as a benefited UE, a supporting bearer of a supporting UE that supports the benefited UE; or to enable the radio access network node to delete, when an updated MUCC capability of a UE does not have a supporting capability and the UE is performing MUCC communication as a supporting UE, a supporting bearer of the supporting UE.

Furthermore, referring to FIG. 7A2, the core network node further includes:

A priority acquiring unit 714 is configured to acquire MUCC priority capability information of the UEs, and transmit the MUCC priority capability information of the UEs to the sending unit 712.

Exemplarily, the MUCC priority of the UE may be set by the radio access network node, and may also be set by the core network node, and then is sent to the radio access network node. The MUCC priority of the UE may further be sent by the UE to the core network node as a part of the information about the MUCC capability identifier, and then is sent by the core network node to the radio access network node. A basis on which the MUCC priority of the UE is set may be selected according to a requirement, and is not limited in this embodiment of the present invention.

The sending unit 712 is further configured to receive the MUCC priority capability information of the UEs from the priority acquiring unit 714, and send the MUCC priority capability information of the UEs to the radio access network node, to enable the radio access network node to select a UE having a low priority and a supporting capability and a UE having a high priority and a benefited capability, so that the UE having a low priority and a supporting capability supports, in MUCC communication, a bearer of the UE having a high priority and a benefited capability.

A processing unit 715 is configured to: when the MUCC capability of the UE is the second supporting capability, perform one or more of the following operations:

in a case in which no IP address is allocated to the UE, allowing the UE to support a bearer of another UE;

in a case in which no PDN connection or bearer is set up for the UE, allowing the UE to support a bearer of another UE; and in a case in which security authentication is not performed on the UE, allowing the UE to support a bearer of another UE.

For the core network node provided in this embodiment of the present invention, acquired MUCC capabilities of different UEs are sent to a radio access network node, to enable the radio access network node to select, according to capability identifiers of the UEs, a UE having a supporting capability and a UE having a benefited capability, so that the UE having a supporting capability supports, in MUCC communication, a bearer of the UE having a benefited capability, thereby improving quality and a success rate of multiple users cooperative communication. This solves a problem in the prior art that a radio access network node is incapable of selecting different UEs according to different MUCC capabilities of UEs to perform proper multiple users cooperative communication.

Figure 8A:
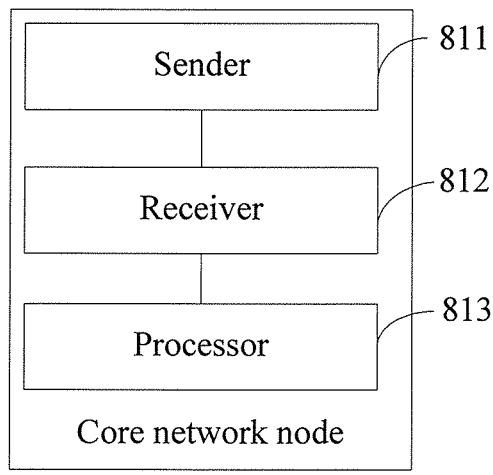
FIG. 8A is a structural diagram of another core network node according to an embodiment of the present invention.

According to an aspect, an embodiment of the present invention provides another core network node. Referring to FIG. 8A, the core network node includes:

A receiver 811 is configured to receive information about MUCC capability identifiers of at least two UEs, and transmit the information about the MUCC capability identifiers of the at least two UEs to a sender 812, where the information about the MUCC capability identifiers is used to identify MUCC capabilities of the UEs, and the MUCC capability includes: a first benefited capability, a first supporting capability, first benefited and first supporting capabilities, a second benefited capability, or a second supporting capability.

Exemplarily, the first benefited capability may indicate that a UE can act as a benefited UE and can also act as a common UE to perform communication. The first supporting capability may indicate that a UE can act as a supporting UE and can also act as a common UE to perform communication. The first benefited and first supporting capabilities may represent that a UE can act as a supporting UE, and can also act as a benefited UE, and can further act as a common UE to perform communication. The second benefited capability represents that a UE can act only as a benefited UE to perform MUCC communication, and cannot act as a supporting UE or a common UE. The second supporting capability represents that a UE can act only as a supporting UE to perform MUCC communication, and cannot act as a benefited UE or a common UE. The MUCC capabilities can be represented by using several bits of information.

Furthermore, the receiver 811 is further configured to receive attach requests or location update requests of the at least two UEs, where the attach requests or location update requests include the information about the MUCC capability identifiers of the UEs.

The receiver 811 is further configured to receive capability information indications that are sent by a radio access network node and of the at least two UEs and save the capability information indications, where the capability information indications of the UEs include the information about the MUCC capability identifiers of the UEs, and the capability information indications of the UEs are generated from capability information sent to the radio access network node by the UEs after the radio access network node sends capability query information to the UEs.

The sender 812 is configured to receive the information about the MUCC capability identifiers of the at least two UEs from the receiver 811, and send the information about the MUCC capability identifiers of the at least two UEs to the radio access network node, to enable the radio access network node to select, according to the capability identifiers of the UEs, a UE having a supporting capability of the MUCC capability and a UE having a benefited capability of the MUCC capability, so that the UE having a supporting capability supports, in MUCC communication, a bearer of the UE having a benefited capability.

Exemplarily, the sender 812 may send the MUCC capabilities of the UEs to the radio access network node by sending an initial context setup request or a handover request to the radio access network node, where the initial context setup request or handover request includes the information about the MUCC capability identifiers of the UEs.

Exemplarily, the UE having a supporting capability of the MUCC capability refers to a UE having the first supporting capability, the first benefited and first supporting capabilities, or the second supporting capability; the UE having a benefited capability of the MUCC capability refers to a UE having the first benefited capability, the first benefited and first supporting capabilities, or the second benefited capability.

A processor 813 is configured to receive the information about the MUCC capability identifiers of the at least two UEs from the receiver 811, perform subscription determining on the MUCC capabilities of the at least two UEs according to subscription information of the at least two UEs, generate information about negotiated MUCC capability identifiers of the at least two UEs, and transmit the negotiated MUCC capability identifiers to the sender 812, where the negotiated MUCC capability identifiers are used to identify the MUCC capabilities of the UEs.

Exemplarily, the processor 813 may acquire the subscription information of the UE from a subscription database, and then performs subscription determining on the MUCC capability of the UE according to the subscription information of the UE. For example, an intersection set between the subscription information of the user and the information about the MUCC capability identifier of the UE may be acquired to generate the negotiated MUCC capability of the UE. For example, the acquired subscription information of the UE allows the UE to act as a benefited UE, but does not allow the UE to act as a supporting UE, whereas the information about the MUCC capability identifier of the UE that is received by the receiver 811 is the first benefited and first supporting capabilities. In this case, the negotiated MUCC capability of the UE that is generated by the processor 813 is the first benefited capability.

Correspondingly, the sender 812 is further configured to receive the negotiated MUCC capability identifiers from the processor 813, and send the negotiated MUCC capability identifiers to the radio access network node, to enable the radio access network node to select, according to the negotiated capability identifiers of the UEs, a UE having a supporting capability of the MUCC capability and a UE having a benefited capability of the MUCC capability, so that the UE having a supporting capability supports, in MUCC communication, a bearer of the UE having a benefited capability.

Furthermore, the receiver 811 is further configured to receive updated information about the MUCC capability identifiers of the UEs, and transmit the updated information about the MUCC capability identifiers to the sender 812.

Exemplarily, a UE may change a MUCC capability of the UE. For example, a UE originally has the first supporting capability, which is then changed into the first benefited and first supporting capabilities, that is, the UE has both a benefited capability and a supporting capability. Alternatively, a UE originally has the first benefited and first supporting capabilities, that is, the UE has both a benefited capability and a supporting capability; to save power or for other objectives, the UE turns off the supporting capability, so that the first benefited and first supporting capabilities are changed into the first benefited capability.

Exemplarily, the core network node may perform, according to the subscription information of the UEs, subscription determining on the updated information about the MUCC capability identifiers sent by the UEs, and generate updated information about negotiated MUCC capability identifiers of the UEs.

The core network node may also skip subscription determining, and instead directly uses the updated information about the MUCC capability identifiers sent by the UEs. Therefore, the updated information about the MUCC capability identifiers may include the updated information about the MUCC capability identifiers or the updated information about the negotiated MUCC capability identifiers of the UEs.

Certainly, the updated information about the MUCC capability identifiers may further be generated because of a change of the subscription information. For example, original subscription of a UE allows the first benefited and first supporting capabilities, subsequently the subscription is changed to allow the first supporting capability, whereas a capability of the UE is the first benefited and first supporting capabilities. In this case, a negotiated MUCC capability is changed from the first benefited and first supporting capabilities to the first supporting capability, and the core network node also needs to send the updated information about a MUCC capability identifier to the radio access network node, so that the radio access network node performs processing on MUCC communication according to an updated MUCC capability of the UE. In this case, step 601 and step 602 are not executed, that is, when the MUCC capability of the UE is not changed, a network does not need to be notified; however, if the subscription of the UE is changed, the MUCC capability may also be changed.

Correspondingly, the sender 812 is further configured to receive the updated information about the MUCC capability identifiers from the receiver 811, and send the updated information about the MUCC capability identifiers to the radio access network node, to enable the radio access network node to delete, when an updated MUCC capability of a UE does not have a benefited capability and the UE is performing MUCC communication as a benefited UE, a supporting bearer of a supporting UE that supports the benefited UE; or to enable the radio access network node to delete, when an updated MUCC capability of a UE does not have a supporting capability and the UE is performing MUCC communication as a supporting UE, a supporting bearer of the supporting UE.

Furthermore, the processor 813 is further configured to acquire MUCC priority capability information of the UEs, and transmit the MUCC priority capability information of the UEs to the sender 812.

Exemplarily, the MUCC priority of the UE may be set by the radio access network node, and may also be set by the core network node, and then is sent to the radio access network node; a basis on which the MUCC priority of the UE is set may be selected according to a requirement. The MUCC priority of the UE may further be sent by the UE to the core network node as a part of the information about the MUCC capability identifier information, and then is sent by the core network node to the radio access network node. This embodiment of the present invention is not limited thereto.

Correspondingly, the sender 812 is further configured to receive the MUCC priority capability information of the UEs from the processor 813, and send the MUCC priority capability information of the UEs to the radio access network node, to enable the radio access network node to select a UE having a low priority and a supporting capability and a UE having a high priority and a benefited capability, so that the UE having a low priority and a supporting capability supports, in MUCC communication, a bearer of the UE having a high priority and a benefited capability.

Furthermore, when the MUCC capability of the UE is the second supporting capability, the processor 813 is further configured to perform one or more of the following operations:

in a case in which no IP address is allocated to the UE, allowing the UE to support a bearer of another UE;

in a case in which no PDN connection or bearer is set up for the UE, allowing the UE to support a bearer of another UE; and in a case in which security authentication is not performed on the UE, allowing the UE to support a bearer of another UE.

For the core network node provided in this embodiment of the present invention, acquired MUCC capabilities of different UEs are sent to a radio access network node, to enable the radio access network node to select, according to capability identifiers of the UEs, a UE having a supporting capability and a UE having a benefited capability, so that the UE having a supporting capability supports, in MUCC communication, a bearer of the UE having a benefited capability, thereby improving quality and a success rate of multiple users cooperative communication. This solves a problem in the prior art that a radio access network node is incapable of selecting different UEs according to different MUCC capabilities of UEs to perform proper multiple users cooperative communication.

Figure 7B:
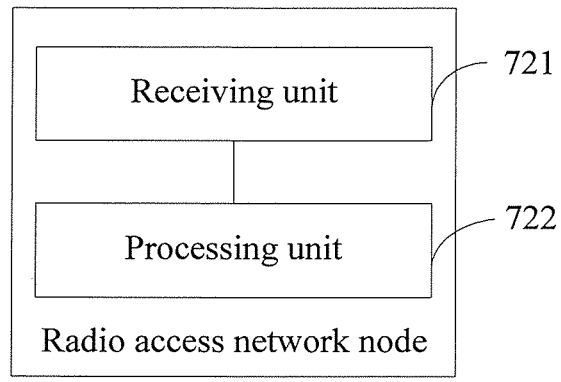
FIG. 7B is a structural diagram of a radio access network node according to an embodiment of the present invention.

According to an aspect, an embodiment of the present invention provides a radio access network node, referring to FIG. 7B, which includes:

A receiving unit 721 is configured to receive information about MUCC capability identifiers of at least two UEs that is sent by a core network node, and transmit the information about the MUCC capability identifiers of the at least two UEs to a processing unit 722, where the MUCC capability identifiers are used to identify MUCC capabilities of the UEs, and the MUCC capability includes: a first benefited capability, a first supporting capability, first benefited and first supporting capabilities, a second benefited capability, or a second supporting capability.

Exemplarily, the first benefited capability may indicate that a UE can act as a benefited UE and can also act as a common UE to perform communication. The first supporting capability may indicate that a UE can act as a supporting UE and can also act as a common UE to perform communication. The first benefited and first supporting capabilities may represent that a UE can act as a supporting UE, and can also act as a benefited UE, and can further act as a common UE to perform communication. The second benefited capability represents that a UE can act only as a benefited UE to perform MUCC communication, and cannot act as a supporting UE or a common UE. The second supporting capability represents that a UE can act only as a supporting UE to perform MUCC communication, and cannot act as a benefited UE or a common UE. The MUCC capabilities can be represented by using several bits of information.

Exemplarily, the receiving unit 721 is further configured to receive an initial context setup request or a handover request sent by the core network node, where the initial context setup request or handover request includes the information about the MUCC capability identifiers of the at least two UEs.

The processing unit 722 is configured to receive the information about the MUCC capability identifiers of the at least two UEs from the receiving unit 721, and select, according to the capability identifiers of the UEs, a UE having a supporting capability of the MUCC capability and a UE having a benefited capability of the MUCC capability, so that the UE having a supporting capability supports, in MUCC communication, a bearer of the UE having a benefited capability.

Exemplarily, the UE having a supporting capability of the MUCC capability refers to a UE having the first supporting capability, the first benefited and first supporting capabilities, or the second supporting capability; the UE having a benefited capability of the MUCC capability refers to a UE having the first benefited capability, the first benefited and first supporting capabilities, or the second benefited capability.

Furthermore, the receiving unit 721 is further configured to receive information about negotiated MUCC capability identifiers of the at least two UEs that is generated after the core network node performs, according to subscription information of the at least two UEs, subscription determining on the MUCC capabilities of the at least two UEs, and transmit the information about the negotiated MUCC capability identifiers to the processing unit 722, where the negotiated MUCC capability identifiers are used to identify the MUCC capabilities of the UEs.

Correspondingly, the processing unit 722 is further configured to receive the information about the negotiated MUCC capability identifiers from the receiving unit 721, and select, according to the negotiated capability identifiers of the at least two UEs, a UE having a supporting capability of the MUCC capability and a UE having a benefited capability of the MUCC capability, so that the UE having a supporting capability supports, in MUCC communication, a bearer of the UE having a benefited capability.

Furthermore, the receiving unit 721 is further configured to receive updated information about the MUCC capability identifiers of the UEs that is sent by the core network node, and transmit the updated information about the MUCC capability identifiers to the processing unit 722.

Correspondingly, the processing unit 722 is further configured to: receive the updated information about the MUCC capability identifiers from the receiving unit 721; and when an updated MUCC capability of a UE does not have a benefited capability and the UE is performing MUCC communication as a benefited UE, delete a supporting bearer of a supporting UE that supports the benefited UE, or when an updated MUCC capability of a UE does not have a supporting capability and the UE is performing MUCC communication as a supporting UE, delete a supporting bearer of the supporting UE.

Furthermore, the receiving unit 721 is further configured to receive MUCC priority capability information of the at least two UEs that is sent by the core network node, and transmit the MUCC priority capability information to the processing unit 722.

Correspondingly, the processing unit 722 is further configured to receive the MUCC priority capability information from the receiving unit 721, and select a UE having a low priority and a supporting capability and a UE having a high priority and a benefited capability, so that the UE having a low priority and a supporting capability supports, in MUCC communication, a bearer of the UE having a high priority and a benefited capability.

Exemplarily, the radio access network node may further acquire the MUCC priority capability information of the UEs, so that the radio access network node may further perform processing on MUCC communication according to MUCC priorities of the UEs. For example, the radio access network node may select a UE having a low MUCC priority and a supporting capability to support a bearer of a UE having a benefited capability and a high MUCC priority, but cannot select a UE having a high MUCC priority and a supporting capability to support a bearer of a UE having a benefited capability and a low MUCC priority. The MUCC priority of the UE may be set by the radio access network node, and may also be set by the core network node (for example, determined by means of subscription), and then is sent to the radio access network node, and may further be sent by the UE to the core network node as a part of the information about the MUCC capability identifier, and then is sent by the core network node to the radio access network node. A basis on which the MUCC priority of the UE is set may be selected according to a requirement, and is not limited in this embodiment of the present invention. It should be noted that the foregoing high and low priorities are in a relative sense. A UE having a relatively high priority may use a UE having a relatively low priority as a supporting UE; a UE having a relatively low priority cannot use a UE having a relatively high priority as a supporting UE.

When the MUCC capability of the UE is the second supporting capability, the processing unit 722 is further configured to keep the UE in an RRC connected state.

For example, an RRC connection of a UE having the second supporting capability is not released, so that the UE having the second supporting capability is kept in the RRC connected state; or an S1 connection is not set up, that is, the UE having the second supporting capability is kept in the RRC connected state.

By receiving MUCC capabilities of different UEs that are sent by a core network node, the radio access network node provided in this embodiment of the present invention can select, according to capability identifiers of the UEs, a UE having a supporting capability and a UE having a benefited capability, so that the UE having a supporting capability supports, in MUCC communication, a bearer of the UE having a benefited capability, thereby improving quality and a success rate of multiple users cooperative communication. This solves a problem in the prior art that a radio access network node is incapable of selecting different UEs according to different MUCC capabilities of UEs to perform proper multiple users cooperative communication.

Figure 8B:
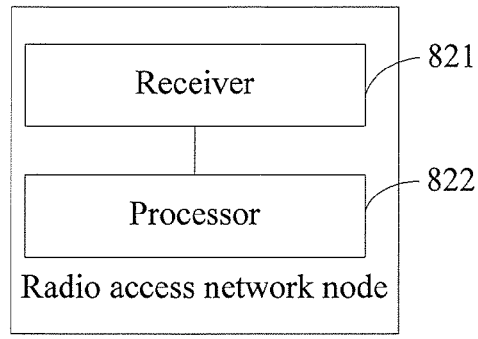
FIG. 8B is a structural diagram of another radio access network node according to an embodiment of the present invention.

According to an aspect, an embodiment of the present invention provides another radio access network node, referring to FIG. 8B, which includes:

A receiver 821 is configured to receive information about MUCC capability identifiers of at least two UEs that is sent by a core network node, and transmit the information about the MUCC capability identifiers of the at least two UEs to a processor 822, where the MUCC capability identifiers are used to identify MUCC capabilities of the UEs, and the MUCC capability includes: a first benefited capability, a first supporting capability, first benefited and first supporting capabilities, a second benefited capability, or a second supporting capability.

Exemplarily, the first benefited capability may indicate that a UE can act as a benefited UE and can also act as a common UE to perform communication. The first supporting capability may indicate that a UE can act as a supporting UE and can also act as a common UE to perform communication. The first benefited and first supporting capabilities may represent that a UE can act as a supporting UE, and can also act as a benefited UE, and can further act as a common UE to perform communication. The second benefited capability represents that a UE can act only as a benefited UE to perform MUCC communication, and cannot act as a supporting UE or a common UE. The second supporting capability represents that a UE can act only as a supporting UE to perform MUCC communication, and cannot act as a benefited UE or a common UE. The MUCC capabilities can be represented by using several bits of information.

Exemplarily, the receiver 821 is further configured to receive an initial context setup request or a handover request sent by the core network node, where the initial context setup request or handover request includes the information about the MUCC capability identifiers of the at least two UEs.

The processor 822 is configured to receive the information about the MUCC capability identifiers of the at least two UEs from the receiver 821, and select, according to the capability identifiers of the UEs, a UE having a supporting capability of the MUCC capability and a UE having a benefited capability of the MUCC capability, so that the UE having a supporting capability supports, in MUCC communication, a bearer of the UE having a benefited capability.

Exemplarily, the UE having a supporting capability of the MUCC capability refers to a UE having the first supporting capability, the first benefited and first supporting capabilities, or the second supporting capability; the UE having a benefited capability of the MUCC capability refers to a UE having the first benefited capability, the first benefited and first supporting capabilities, or the second benefited capability.

Furthermore, the receiver 821 is further configured to receive information about negotiated MUCC capability identifiers of the at least two UEs that is generated after the core network node performs, according to subscription information of the at least two UEs, subscription determining on the MUCC capabilities of the at least two UEs, and transmit the information about the negotiated MUCC capability identifiers to the processor 822, where the negotiated MUCC capability identifiers are used to identify the MUCC capabilities of the UEs.

Correspondingly, the processor 822 is further configured to receive the information about the negotiated MUCC capability identifiers from the receiver 821, and select, according to the negotiated capability identifiers of the at least two UEs, a UE having a supporting capability of the MUCC capability and a UE having a benefited capability of the MUCC capability, so that the UE having a supporting capability supports, in MUCC communication, a bearer of the UE having a benefited capability.

Furthermore, the receiver 821 is further configured to receive updated information about the MUCC capability identifiers of the UEs that is sent by the core network node, and transmit the updated information about the MUCC capability identifiers to the processor 822.

Correspondingly, the processor 822 is further configured to: receive the updated information about the MUCC capability identifiers from the receiver 821; and when an updated MUCC capability of a UE does not have a benefited capability and the UE is performing MUCC communication as a benefited UE, delete a supporting bearer of a supporting UE that supports the benefited UE, or when an updated MUCC capability of a UE does not have a supporting capability and the UE is performing MUCC communication as a supporting UE, delete a supporting bearer of the supporting UE.

Furthermore, the receiver 821 is further configured to receive MUCC priority capability information of the at least two UEs that is sent by the core network node, and transmit the MUCC priority capability information to the processor 822.

Correspondingly, the processor 822 is further configured to receive the MUCC priority capability information from the receiver 821, and select a UE having a low priority and a supporting capability and a UE having a high priority and a benefited capability, so that the UE having a low priority and a supporting capability supports, in MUCC communication, a bearer of the UE having a high priority and a benefited capability.

Exemplarily, the radio access network node may further acquire the MUCC priority capability information of the UEs, so that the radio access network node may further perform processing on MUCC communication according to MUCC priorities of the UEs. For example, the radio access network node may select a UE having a low MUCC priority and a supporting capability to support a bearer of a UE having a benefited capability and a high MUCC priority, but cannot select a UE having a high MUCC priority and a supporting capability to support a bearer of a UE having a benefited capability and a low MUCC priority. The MUCC priority of the UE may be set by the radio access network node, and may also be set by the core network node (for example, determined by means of subscription), and then is sent to the radio access network node, and may further be sent by the UE to the core network node as a part of the information about the MUCC capability identifier, and then is sent by the core network node to the radio access network node. A basis on which the MUCC priority of the UE is set may be selected according to a requirement, and is not limited in this embodiment of the present invention. It should be noted that, the foregoing high and low priorities are in a relative sense. A UE having a relatively high priority may use a UE having a relatively low priority as a supporting UE; a UE having a relatively low priority cannot use a UE having a relatively high priority as a supporting UE.

Furthermore, when the MUCC capability of the UE is the second supporting capability, the processor 822 is further configured to keep the UE in an RRC connected state.

For example, an RRC connection of a UE having the second supporting capability is not released, so that the UE having the second supporting capability is kept in the RRC connected state; or an S1 connection is not set up, that is, the UE having the second supporting capability is kept in the RRC connected state.

By receiving MUCC capabilities of different UEs that are sent by a core network node, the radio access network node provided in this embodiment of the present invention can select, according to capability identifiers of the UEs, a UE having a supporting capability and a UE having a benefited capability, so that the UE having a supporting capability supports, in MUCC communication, a bearer of the UE having a benefited capability, thereby improving quality and a success rate of multiple users cooperative communication. This solves a problem in the prior art that a radio access network node is incapable of selecting different UEs according to different MUCC capabilities of UEs to perform proper multiple users cooperative communication.

Figure 7C:
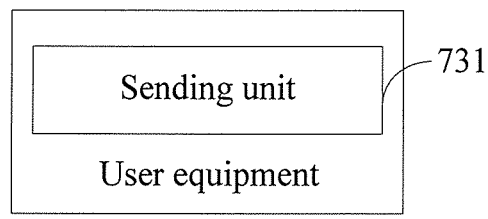
FIG. 7C is a structural diagram of a UE according to an embodiment of the present invention.

According to an aspect, an embodiment of the present invention provides a UE. Referring to FIG. 7C, the UE includes:

A sending unit 731 is configured to send information about a MUCC capability identifier of the UE to a core network node, to enable the core network node to send the information about the MUCC capability identifiers of at least two such UEs to a radio access network node, so as to enable the radio access network node to select, according to the capability identifiers of the UEs, a UE having a supporting capability and a UE having a benefited capability of the MUCC capability, so that the UE having a supporting capability supports, in MUCC communication, a bearer of the UE having a benefited capability, where the MUCC capability identifiers are used to identify the MUCC capabilities of the UEs, and the MUCC capability includes: a first benefited capability, a first supporting capability, first benefited and first supporting capabilities, a second benefited capability, or a second supporting capability.

Exemplarily, the sending unit 731 is further configured to send an attach request or a location update request to the core network node, where the attach request or location update request includes the information about the MUCC capability identifier of the UE.

Exemplarily, the sending unit 731 is further configured to send updated information about the MUCC capability identifiers of the UEs to the core network node, to enable the core network node to send the updated information about the MUCC capability identifiers of the UEs to the radio access network node, so as to enable the radio access network node to delete, when an updated MUCC capability of a UE does not have a benefited capability and the UE is performing MUCC communication as a benefited UE, a supporting bearer of a supporting UE that supports the benefited UE; or so as to enable the radio access network node to delete, when an updated MUCC capability of a UE does not have a supporting capability and the UE is performing MUCC communication as a supporting UE, a supporting bearer of the supporting UE.

Exemplarily, the UE may change the MUCC capability of the UE. For example, a UE originally has the first supporting capability, which is then changed into the first benefited and first supporting capabilities, that is, the UE has both a benefited capability and a supporting capability. Alternatively, a UE originally has the first benefited and first supporting capabilities, that is, the UE has both a benefited capability and a supporting capability; to save power or for other objectives, the UE turns off the supporting capability, so that the first benefited and first supporting capabilities are changed into the first benefited capability.

Furthermore, the sending unit 731 is further configured to send MUCC priority capability information of the UEs to the core network node, to enable the core network node to send the MUCC priority capability information of the UEs to the radio access network node, so as to enable the radio access network node to select a UE having a low priority and a supporting capability and a UE having a high priority and a benefited capability, so that the UE having a low priority and a supporting capability supports, in MUCC communication, a bearer of the UE having a high priority and a benefited capability.

For the UE provided in this embodiment of the present invention, information about MUCC capability identifiers of the UEs is sent to a core network node, to enable the core network node to send MUCC capabilities of the UEs to a radio access network node, so as to enable the radio access network node to select, according to the capability identifiers of the UEs, a UE having a supporting capability and a UE having a benefited capability, so that the UE having a supporting capability supports, in MUCC communication, a bearer of the UE having a benefited capability, thereby improving quality and a success rate of multiple users cooperative communication. This solves a problem in the prior art that a radio access network node is incapable of selecting different UEs according to different MUCC capabilities of UEs to perform proper multiple users cooperative communication.

Figure 8C:
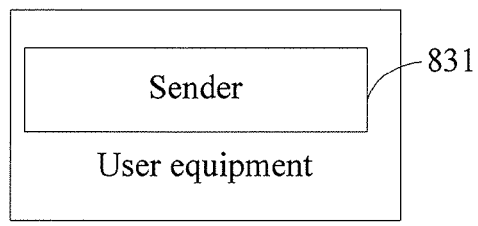
FIG. 8C is a structural diagram of another UE according to an embodiment of the present invention.

According to an aspect, an embodiment of the present invention provides another UE. Referring to FIG. 8C, the UE includes:

A sender 831 is configured to send information about a MUCC capability identifier of the UE to a core network node, to enable the core network node to send the information about the MUCC capability identifiers of at least two such UEs to a radio access network node, so as to enable the radio access network node to select, according to the capability identifiers of the UEs, a UE having a supporting capability and a UE having a benefited capability of the MUCC capability, so that the UE having a supporting capability supports, in MUCC communication, a bearer of the UE having a benefited capability, where the MUCC capability identifiers are used to identify the MUCC capabilities of the UEs, and the MUCC capability includes: a first benefited capability, a first supporting capability, first benefited and first supporting capabilities, a second benefited capability, or a second supporting capability.

Exemplarily, the sender 831 is further configured to send an attach request or a location update request to the core network node, where the attach request or location update request includes the information about the MUCC capability identifier of the UE.

Furthermore, the sender 831 is further configured to send updated information about the MUCC capability identifiers of the UEs to the core network node, to enable the core network node to send the updated information about the MUCC capability identifiers of the UEs to the radio access network node, so as to enable the radio access network node to delete, when an updated MUCC capability of a UE does not have a benefited capability and the UE is performing MUCC communication as a benefited UE, a supporting bearer of a supporting UE that supports the benefited UE; or so as to enable the radio access network node to delete, when an updated MUCC capability of a UE does not have a supporting capability and the UE is performing MUCC communication as a supporting UE, a supporting bearer of the supporting UE.

Exemplarily, the UE may change the MUCC capability of the UE. For example, a UE originally has the first supporting capability, which is then changed into the first benefited and first supporting capabilities, that is, the UE has both a benefited capability and a supporting capability. Alternatively, a UE originally has the first benefited and first supporting capabilities, that is, the UE has both a benefited capability and a supporting capability; to save power or for other objectives, the UE turns off the supporting capability, so that the first benefited and first supporting capabilities are changed into the first benefited capability.

Furthermore, the sender 831 is further configured to send MUCC priority capability information of the UEs to the core network node, to enable the core network node to send the MUCC priority capability information of the UEs to the radio access network node, so as to enable the radio access network node to select a UE having a low priority and a supporting capability and a UE having a high priority and a benefited capability, so that the UE having a low priority and a supporting capability supports, in MUCC communication, a bearer of the UE having a high priority and a benefited capability.

For the UE provided in this embodiment of the present invention, information about MUCC capability identifiers of UEs is sent to a core network node, to enable the core network node to send MUCC capabilities of the UEs to a radio access network node, so as to enable the radio access network node to select, according to the capability identifiers of the UEs, a UE having a supporting capability and a UE having a benefited capability, so that the UE having a supporting capability supports, in MUCC communication, a bearer of the UE having a benefited capability, thereby improving quality and a success rate of multiple users cooperative communication. This solves a problem in the prior art that a radio access network node is incapable of selecting different UEs according to different MUCC capabilities of UEs to perform proper multiple users cooperative communication.

Figure 9A:
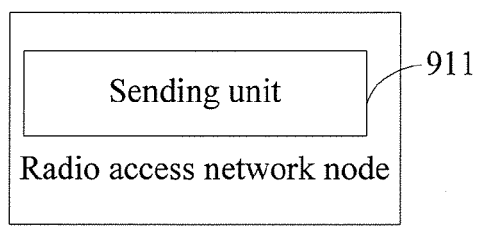
FIG. 9A is a structural diagram of another radio access network node according to an embodiment of the present invention.

According to an aspect, an embodiment of the present invention provides another radio access network node, referring to FIG. 9A, which includes:

A sending unit 911 is configured to send information about a MUCC capability identifier of the radio access network node to a core network node and a UE, so that the core network node and the UE initiate MUCC communication when the MUCC capability identifier of the radio access network node indicates that the radio access network node has a MUCC capability of supporting, where the MUCC capability identifier of the radio access network node is used to indicate that the radio access network node has a MUCC capability of supporting.

Exemplarily, the sending unit 911 may notify the core network node of the information about the MUCC capability identifier of the radio access network node by using an S1 setup request or an eNB Configuration Update message.

The sending unit 911 may further deliver the information about the MUCC capability identifier of the radio access network node to the UE by using a broadcast message (for example, a system information block, System Information Block, SIB for short), and may also send the information about the MUCC capability identifier of the radio access network node to the UE by using a form such as an RRC message for the UE.

Furthermore, the MUCC capability identifier of the radio access network node further indicates that the radio access network node does not have a MUCC capability of supporting, so that the core network node and the UE skip initiating MUCC communication when the MUCC capability identifier of the radio access network node indicates that the radio access network node does not have a MUCC processing capability.

For the radio access network node provided in this embodiment of the present invention, information about a MUCC capability identifier of the radio access network node is sent to a core network node and a UE, so that the core network node and the UE perform proper multiple users cooperative communication according to a different MUCC capability of the radio access network node, thereby improving quality and a success rate of multiple users cooperative communication.

Figure 10A:
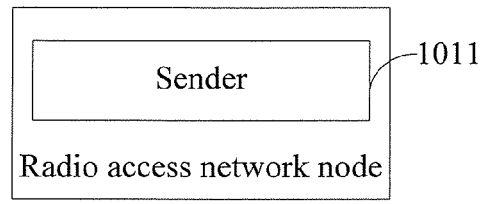
FIG. 10A is a structural diagram of another radio access network node according to an embodiment of the present invention.

According to an aspect, an embodiment of the present invention provides another radio access network node, referring to FIG. 10A, which includes:

A sender 1011 is configured to send information about a MUCC capability identifier of the radio access network node to a core network node and a UE, so that the core network node and the UE initiate MUCC communication when the MUCC capability identifier of the radio access network node indicates that the radio access network node has a MUCC capability of supporting, where the MUCC capability identifier of the radio access network node is used to indicate that the radio access network node has a MUCC capability of supporting.

Exemplarily, the sender 1011 may notify the core network node of the information about the MUCC capability identifier of the radio access network node by using an S1 setup request or an eNB Configuration Update message.

The sender 1011 may further deliver the information about the MUCC capability identifier of the radio access network node to the UE by using a broadcast message (for example, a system information block, System Information Block, SIB for short), and may also send the information about the MUCC capability identifier of the radio access network node to the UE by using a form such as an RRC message for the UE.

Furthermore, the MUCC capability identifier of the radio access network node further indicates that the radio access network node does not have a MUCC capability of supporting, so that the core network node and the UE skip initiating MUCC communication when the MUCC capability identifier of the radio access network node indicates that the radio access network node does not have a MUCC processing capability.

For the radio access network node provided in this embodiment of the present invention, information about a MUCC capability identifier of the radio access network node is sent to a core network node and a UE, so that the core network node and the UE perform proper multiple users cooperative communication according to a different MUCC capability of the radio access network node, thereby improving quality and a success rate of multiple users cooperative communication.

Figure 9B:
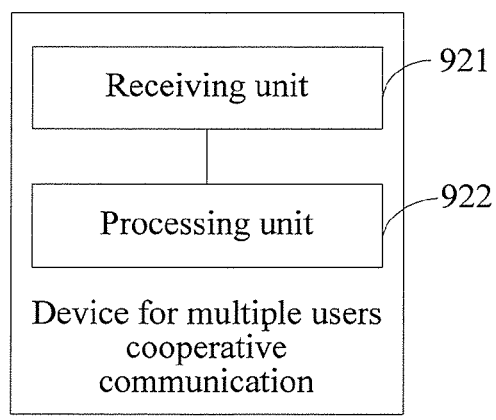
FIG. 9B is a structural diagram of a device for multiple users cooperative communication according to an embodiment of the present invention.

A device for multiple users cooperative communication provided in another embodiment of the present invention, referring to FIG. 9B, includes:

A receiving unit 921 is configured to receive information about a MUCC capability identifier of a radio access network node that is sent by the radio access network node, and transmit the information about the MUCC capability identifier of the radio access network node to a processing unit 922, where the MUCC capability identifier of the radio access network node is used to indicate that the radio access network node has a MUCC capability of supporting.

Exemplarily, the device for multiple users cooperative communication may be a UE or a core network node. The radio access network node may notify the core network node of the information about the MUCC capability identifier of the radio access network node by using an S1 setup request or an eNB Configuration Update message.

The radio access network node may further deliver the information about the MUCC capability identifier of the radio access network node to the UE by using a broadcast message (for example, a system information block, System Information Block, SIB for short), and may also send the information about the MUCC capability identifier of the radio access network node to the UE by using a form such as an RRC message for the UE.

The processing unit 922 is configured to receive the information about the MUCC capability identifier of the radio access network node from the receiving unit 921, and initiate MUCC communication when the MUCC capability identifier of the radio access network node indicates that the radio access network node has a MUCC capability.

Furthermore, the MUCC capability identifier of the radio access network node further indicates that the radio access network node does not have a MUCC capability, and if the MUCC capability identifier of the radio access network node indicates that the radio access network node does not have a MUCC capability, the processing unit 922 does not initiate MUCC communication.

For example, when the device for multiple users cooperative communication is a core network node, in a MUCC process controlled by the core network node, the core network node does not initiate a process of multiple users cooperative communication for the radio access network node if the radio access network node does not have a MUCC capability, that is, cannot process MUCC communication.

For another example, when the device for multiple users cooperative communication is a UE, the UE may initiate a communication operation of MUCC if the radio access network node has a MUCC capability, that is, can process MUCC communication; the UE does not initiate a communication operation of MUCC if the radio access network node does not have a MUCC capability, that is, cannot process MUCC communication. For example, after a benefited UE receives an information identifier indicating that the radio access network node has a MUCC capability, the UE may initiate a process of discovering a supporting UE, so as to initiate multiple users cooperative communication; after the benefited UE receives an information identifier indicating that the radio access network node does not have a MUCC capability, the UE does not initiate a process of discovering a supporting UE, and multiple users cooperative communication cannot be initiated.

For the device for multiple users cooperative communication provided in this embodiment of the present invention, information about a MUCC capability identifier of a radio access network node is acquired, and proper multiple users cooperative communication is performed according to a different MUCC capability of the radio access network node, thereby improving quality and a success rate of multiple users cooperative communication.

Figure 10B:
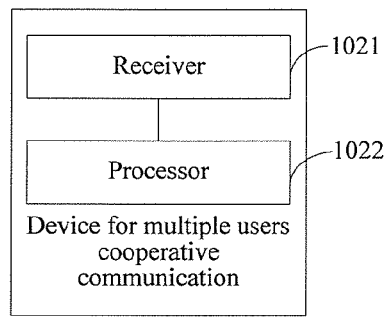
FIG. 10B is a structural diagram of another device for multiple users cooperative communication according to an embodiment of the present invention.

A device for multiple users cooperative communication provided in another embodiment of the present invention, referring to FIG. 10B, includes:

A receiver 1021 is configured to receive information about a MUCC capability identifier of a radio access network node that is sent by the radio access network node, and transmit the information about the MUCC capability identifier of the radio access network node to a processor 1022, where the MUCC capability identifier of the radio access network node is used to indicate that the radio access network node has a MUCC capability.

Exemplarily, the device for multiple users cooperative communication may be a UE or a core network node. The radio access network node may notify the core network node of the information about the MUCC capability identifier of the radio access network node by using an S1 setup request or an eNB Configuration Update message.

The radio access network node may further deliver the information about the MUCC capability identifier of the radio access network node to the UE by using a broadcast message (for example, SIB), and may also send the information about the MUCC capability identifier of the radio access network node to the UE by using a form such as an RRC message for the UE.

The processor 1022 is configured to receive the information about the MUCC capability identifier of the radio access network node from the receiver 1021, and initiate MUCC communication when the MUCC capability identifier of the radio access network node indicates that the radio access network node has a MUCC capability.

Furthermore, the MUCC capability identifier of the radio access network node further indicates that the radio access network node does not have a MUCC capability, and if the MUCC capability identifier of the radio access network node indicates that the radio access network node does not have a MUCC capability, the processor 1022 does not initiate MUCC communication.

For example, when the device for multiple users cooperative communication is a core network node, in a MUCC process controlled by the core network node, the core network node does not initiate a process of multiple users cooperative communication for the radio access network node if the radio access network node does not have a MUCC capability, that is, cannot process MUCC communication.

For another example, when the device for multiple users cooperative communication is a UE, the UE may initiate a communication operation of MUCC if the radio access network node has a MUCC capability, that is, can process MUCC communication; the UE does not initiate a communication operation of MUCC if the radio access network node does not have a MUCC capability, that is, cannot process MUCC communication. For example, after a benefited UE receives an information identifier indicating that the radio access network node has a MUCC capability, the UE may initiate a process of discovering a supporting UE, so as to initiate multiple users cooperative communication; after the benefited UE receives an information identifier indicating that the radio access network node does not have a MUCC capability, the UE does not initiate a process of discovering a supporting UE, and multiple users cooperative communication cannot be initiated.

For the device for multiple users cooperative communication provided in this embodiment of the present invention, information about a MUCC capability identifier of a radio access network node is acquired, and proper multiple users cooperative communication is performed according to a different MUCC capability of the radio access network node, thereby improving quality and a success rate of multiple users cooperative communication.

Figure 11:
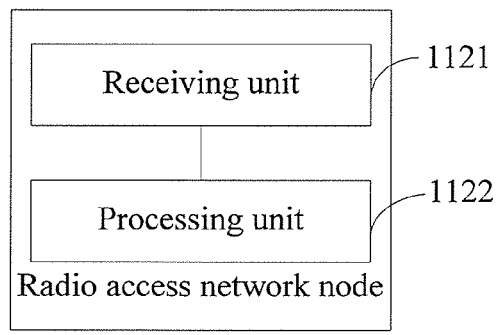
FIG. 11 is a structural diagram of another radio access network node according to an embodiment of the present invention.

A radio access network node provided in another embodiment of the present invention, referring to FIG. 11, includes:

A receiving unit 1121 is configured to receive information about a MUCC capability identifier of a core network node that is sent by the core network node, and transmit the information about the MUCC capability identifier of the core network node to a processing unit 1122, where the MUCC capability identifier of the core network node is used to indicate that the core network node has a MUCC capability.

Exemplarily, the receiving unit 1121 may receive the information about the MUCC capability identifier of the core network node by using an S1 setup response message or a core network node configuration update message.

The processing unit 1122 is configured to: receive the information about the MUCC capability identifier of the core network node from the receiving unit, and when the MUCC capability identifier of the core network node indicates that the core network node has a MUCC capability, initiate a MUCC operation on a UE that has registered with the core network node.

Furthermore, the MUCC capability identifier of the core network node further indicates that the core network node does not have a MUCC capability, and the processing unit is further configured to skip initiating a MUCC operation on a UE that has registered with the core network node when the MUCC capability identifier of the core network node indicates that the core network node does not have a MUCC capability.

For the radio access network node provided in this embodiment of the present invention, information about a MUCC capability identifier of a core network node is acquired, and proper multiple users cooperative communication is performed according to a different MUCC capability of the core network node, thereby improving quality and a success rate of multiple users cooperative communication.

Figure 12:
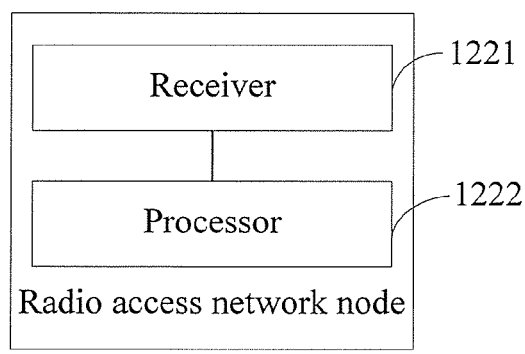
FIG. 12 is a structural diagram of another radio access network node according to an embodiment of the present invention.

A radio access network node provided in another embodiment of the present invention, referring to FIG. 12, includes:

A receiver 1221 is configured to receive information about a MUCC capability identifier of a core network node that is sent by the core network node, and transmit the information about the MUCC capability identifier of the core network node to a processor 1222, where the MUCC capability identifier of the core network node is used to indicate that the core network node has a MUCC capability.

Exemplarily, the receiver 1221 may receive the information about the MUCC capability identifier of the core network node by using an S1 setup response message or a core network node configuration update message.

The processor 1222 is configured to: receive the information about the MUCC capability identifier of the core network node from the receiver, and when the MUCC capability identifier of the core network node indicates that the core network node has a MUCC capability, initiate a MUCC operation on a UE that has registered with the core network node.

Furthermore, the MUCC capability identifier of the core network node further indicates that the core network node does not have a MUCC capability, and the processor is further configured to skip initiating a MUCC operation on a UE that has registered with the core network node when the MUCC capability identifier of the core network node indicates that the core network node does not have a MUCC capability.

For the radio access network node provided in this embodiment of the present invention, information about a MUCC capability identifier of a core network node is acquired, and proper multiple users cooperative communication is performed according to a different MUCC capability of the core network node, thereby improving quality and a success rate of multiple users cooperative communication.

The present invention further provides a communications system, which includes the core network node involved any one of FIG. 7A1, FIG. 7A2 and FIG. 8A, the radio access network node involved in FIG. 7B or FIG. 8B, and the UE involved in FIG. 7C or FIG. 8C.

For the system for multiple users cooperative communication provided in this embodiment of the present invention, UEs send information about MUCC capability identifiers of the UEs to a core network node, and the core network node then sends the information about the MUCC capability identifiers of the UEs to a radio access network node, so as to enable the radio access network node to select, according to different information about the MUCC capability identifiers of the UEs, different UEs to perform proper multiple users cooperative communication, thereby improving quality and a success rate of multiple users cooperative communication. This solves a problem in the prior art that a radio access network node is incapable of selecting different UEs according to different MUCC capabilities of UEs to perform proper multiple users cooperative communication.

The present invention further provides another communications system, which includes the radio access network node involved in FIG. 9A or FIG. 10A and the device for multiple users cooperative communication involved in FIG. 9B or FIG. 10B.

For the system for multiple users cooperative communication provided in this embodiment of the present invention, a radio access network node sends information about a MUCC capability identifier of the radio access network node to a device for multiple users cooperative communication, so as to enable the device for multiple users cooperative communication to perform proper multiple users cooperative communication according to a different MUCC capability of the radio access network node, thereby improving quality and a success rate of multiple users cooperative communication.

The present invention further provides another communications system, which includes the radio access network node involved FIG. 11B or FIG. 12B and a core network node.

For the system for multiple users cooperative communication provided in this embodiment of the present invention, a core network node sends information about a MUCC capability identifier of the core network node to a radio access network node, so as to enable the radio access network node to perform proper multiple users cooperative communication according to a different MUCC capability of the core network node, thereby improving quality and a success rate of multiple users cooperative communication.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for multiple users cooperative communication, the method comprising:
   receiving, by a radio access network node, multiple users cooperative communication (MUCC) capability identifiers of at least two user equipments (UEs) that are sent by a core network node, wherein the MUCC capability identifiers are used to identify MUCC capabilities of the UEs, and the MUCC capability comprises: a first benefited capability, a first supporting capability, first benefited and first supporting capabilities, a second benefited capability, or a second supporting capability;
   selecting, by the radio access network node according to the MUCC capability identifiers of the at least two UEs, a UE having a supporting capability of the MUCC capability and a UE having a benefited capability of the MUCC capability, so that the UE having a supporting capability supports, in MUCC communication, a bearer of the UE having a benefited capability;
   receiving, by the radio access network node, negotiated MUCC capability identifiers of the at least two UEs that is generated after the core network node performs, according to subscription information of the at least two UEs, subscription determining on the MUCC capabilities of the at least two UEs, wherein the negotiated MUCC capability identifiers are used to identify the MUCC capabilities of the UEs; and
   selecting, by the radio access network node according to the negotiated MUCC capability identifiers of the at least two UEs, a UE having a supporting capability of the MUCC capability and a UE having a benefited capability of the MUCC capability, so that the UE having a supporting capability supports, in MUCC communication, a bearer of the UE having a benefited capability.

2. The method according to claim 1, wherein receiving, by the radio access network node, the MUCC capability identifiers of at least two UEs sent by the core network node comprises:
   receiving, by the radio access network node, an initial context setup request or a handover request sent by the core network node, wherein the initial context setup request or handover request comprises the MUCC capability identifiers of the at least two UEs.

3. The method according to claim 1, wherein:
   the UE having a supporting capability of the MUCC capability refers to a UE having the first supporting capability, the first benefited and first supporting capabilities, or the second supporting capability; and
   the UE having a benefited capability of the MUCC capability refers to a UE having the first benefited capability, the first benefited and first supporting capabilities, or the second benefited capability.

4. The method according to claim 1, further comprising:
   receiving, by the radio access network node, updated MUCC capability identifiers of the at least two UEs that is sent by the core network node; and
   when an updated MUCC capability of a UE does not have a benefited capability and the UE is performing MUCC communication as a benefited UE, deleting, by the radio access network node, a supporting bearer of a supporting UE that supports the benefited UE; or
   when an updated MUCC capability of a UE does not have a supporting capability and the UE is performing MUCC communication as a supporting UE, deleting, by the radio access network node, a supporting bearer of the supporting UE.

5. The method according to claim 1, further comprising:
   receiving, by the radio access network node, MUCC priority capability information of the at least two UEs that is sent by the core network node; and
   selecting, by the radio access network node, a UE having a low priority and a supporting capability and a UE having a high priority and a benefited capability, so that the UE having a low priority and a supporting capability supports, in MUCC communication, a bearer of the UE having a high priority and a benefited capability.

6. The method according to claim 1, wherein when the MUCC capability of the UE is the second supporting capability, the method further comprises:
   keeping, by the radio access network node, the UE in an RRC connected state.

7. A method for multiple users cooperative communication, the method comprising:
   sending, by a radio access network node, a multiple users cooperative communication (MUCC) capability identifier of the radio access network node to a core network node and a user equipment (UE), so that the core network node and the UE initiate MUCC communication when the MUCC capability identifier of the radio access network node indicates that the radio access network node has a MUCC capability, wherein the MUCC capability identifier of the radio access network node is used to indicate that the radio access network node has a MUCC capability;

wherein the MUCC capability identifier of the radio access network node further indicates that the radio access network node does not have a MUCC capability, so that the core network node and the UE skip initiating MUCC communication when the MUCC capability identifier of the radio access network node indicates that the radio access network node does not have a MUCC capability.

8. A radio access network node, comprising:

a receiver, configured to receive multiple users cooperative communication (MUCC) capability identifiers of at least two user equipments (UE) that are sent by a core network node, wherein the MUCC capability identifiers are used to identify MUCC capabilities of the UEs, and the MUCC capability comprises: a first benefited capability, a first supporting capability, first benefited and first supporting capabilities, a second benefited capability, or a second supporting capability; and a processor, configured to select a UE having a supporting capability of the MUCC capability and a UE having a benefited capability of the MUCC capability, according to the MUCC capability identifiers of the at least two UEs receiving from the receiver, so that the UE having a supporting capability supports, in MUCC communication, a bearer of the UE having a benefited capability; wherein the receiver is further configured to receive negotiated MUCC capability identifiers of the at least two UEs that is generated after the core network node performs, according to subscription information of the at least two UEs, subscription determining on the MUCC capabilities of the at least two UEs, wherein the negotiated MUCC capability identifiers are used to identify the MUCC capabilities of the UEs; and the processor is further configured to select a UE having a supporting capability of the MUCC capability and a UE having a benefited capability of the MUCC capability, according to the negotiated MUCC capability identifiers of the at least two UEs received by the receiver, and, so that the UE having a supporting capability supports, in MUCC communication, a bearer of the UE having a benefited capability.

9. The radio access network node according to claim 8, wherein the receiver is further configured to receive an initial context setup request or a handover request sent by the core network node, wherein the initial context setup request or handover request comprises the MUCC capability identifiers of the at least two UEs.

10. The radio access network node according to claim 8, wherein:

the UE having a supporting capability of the MUCC capability refers to a UE having the first supporting capability, the first benefited and first supporting capabilities, or the second supporting capability; and the UE having a benefited capability of the MUCC capability refers to a UE having the first benefited capability, the first benefited and first supporting capabilities, or the second benefited capability.

11. The radio access network node according to claim 8, wherein:

the receiver is further configured to receive updated MUCC capability identifiers of the at least two UEs that is sent by the core network node; and the processor is further configured to, when an updated MUCC capability identifier of a UE received by the receiver does not have a benefited capability and the UE is performing MUCC communication as a benefited UE, delete a supporting bearer of a supporting UE that supports the benefited UE.

12. A radio access network node, comprising:

a receiver, configured to receive multiple users cooperative communication (MUCC) capability identifiers of at least two user equipments (UE) that are sent by a core network node, wherein the MUCC capability identifiers are used to identify MUCC capabilities of the UEs, and the MUCC capability comprises: a first benefited capability, a first supporting capability, first benefited and first supporting capabilities, a second benefited capability, or a second supporting capability; and processor, configured to select a UE having a supporting capability of the MUCC capability and a UE having a benefited capability of the MUCC capability, according to the MUCC capability identifiers of the at least two UEs receiving from the receiver, so that the UE having a supporting capability supports, in MUCC communication, a bearer of the UE having a benefited capability; wherein:

the receiver is further configured to receive updated MUCC capability identifiers of the at least two UEs that is sent by the core network node; and the processor further configured to, when an updated MUCC capability identifier of a UE received by the receiver does not have a supporting capability and the UE is performing MUCC communication as a supporting UE, delete a supporting bearer of the supporting UE.

13. The radio access network node according to claim 8, wherein:

the receiver is further configured to receive MUCC priority capability information of the at least two UEs that is sent by the core network node; and the processor is further configured to select a UE having a low priority and a supporting capability and a UE having a high priority and a benefited capability according to the MUCC priority capability information of the at least two UEs received by the receiver, so that the UE having a low priority and a supporting capability supports, in MUCC communication, a bearer of the UE having a high priority and a benefited capability.

14. The radio access network node according to claim 8, wherein the processing unit is further configured to, when the MUCC capability of the UE is the second supporting capability, keep the UE in an RRC connected state.

15. A radio access network node, comprising:

a transmitter, configured to send a multiple users cooperative communication (MUCC) capability identifier of the radio access network node to a core network node and a user equipment (UE), so that the core network node and the UE initiate MUCC communication when the MUCC capability identifier of the radio access network node indicates that the radio access network node has a MUCC capability, wherein the MUCC capability identifier of the radio access network node is used to indicate that the radio access network node has a MUCC capability;

wherein the MUCC capability identifier of the radio access network node further indicates that the radio access network node does not have a MUCC capability, so that the core network node and the UE skip initiating MUCC communication when the MUCC capability identifier of the radio access network node indicates that the radio access network node does not have a MUCC processing capability.

* * * * *